US012789829B2

(12) United States Patent
Bachar et al.

(10) Patent No.: US 12,789,829 B2
(45) Date of Patent: Nov. 10, 2026

(54) ADAPTIVE ADVANCED DRIVER-ASSISTANCE SYSTEM (ADAS)

(71) Applicant: Mobileye Vision Technologies Ltd., Jerusalem (IL)

(72) Inventors: David Bachar, Kfar Saba (IL); Elad Serfaty, Rama (IL); Eli Harel, Meitar (IL); Meiron Cohen, Tzur Hadassah (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 19 days.

(21) Appl. No.: 18/851,816

(22) PCT Filed: Mar. 30, 2023

(86) PCT No.: PCT/IB2023/053206

§ 371 (c)(1),
(2) Date: Sep. 27, 2024

(87) PCT Pub. No.: WO2023/187718

PCT Pub. Date: Oct. 5, 2023

(65) Prior Publication Data

US 2025/0326399 A1 Oct. 23, 2025

Related U.S. Application Data

(60) Provisional application No. 63/326,072, filed on Mar. 31, 2022.

(51) Int. Cl.
*B60W 50/14* (2020.01)
*B60W 50/00* (2006.01)
(Continued)

(52) U.S. Cl.
CPC ........... *B60W 50/14* (2013.01); *G08G 1/0116* (2013.01); *G08G 1/0141* (2013.01);
(Continued)

(58) Field of Classification Search
CPC ............. B60W 50/14; B60W 2556/45; B60W 2555/20; B60W 2050/0083;
(Continued)

(56) References Cited

U.S. PATENT DOCUMENTS

| | | | | |
|---|---|---|---|---|
| 9,280,741 | B2 * | 3/2016 | Thapliyal | G06N 5/025 |
| 10,783,725 | B1 * | 9/2020 | Gaudin | B60W 40/09 |

(Continued)

FOREIGN PATENT DOCUMENTS

| | | | | | |
|---|---|---|---|---|---|
| CA | 3023697 | A1 | * 12/2017 | G08G 1/096883 |
| CN | 106114352 | A | * 11/2016 | B60Q 5/008 |
| JP | 2019160085 | A | * 9/2019 | |

OTHER PUBLICATIONS

Aug. 15, 2023 (PCT) International Search Report and Written Opinion—App. PCT/IB2023/053206.

*Primary Examiner* — Chico A Foxx
(74) *Attorney, Agent, or Firm* — Banner & Witcoff, Ltd.

(57) ABSTRACT

Techniques are disclosed to enable an adaptive vehicle advanced driver assistance system (ADAS) unit, which is also referred to as a "smart" ADAS. The smart ADAS unit transmits vehicle ADAS messages, which are received and aggregated by a remote computing system. The remote computing system may optionally include, in the aggregated data set, supplemental data such as weather information, traffic data, etc. The remote computing system identifies, from the aggregated data set, ADAS alert events and their corresponding locations, and uses predetermined rule sets to identify potential ADAS alert configuration settings that may be updated by vehicles in a service range. The ADAS configuration messages provide each vehicle with instructions regarding if, when, and how the ADAS configuration settings should be adjusted, which may comprise the adjustment of ADAS alert sensitivity settings to dynamically
(Continued)

adjust the manner in which ADAS alerts are issued per each ADAS alert event.

30 Claims, 8 Drawing Sheets

(51) Int. Cl.
*G08G 1/01* (2006.01)
*G08G 1/0967* (2006.01)

(52) U.S. Cl.
CPC ................. *G08G 1/096775* (2013.01); *B60W 2050/0083* (2013.01); *B60W 2050/146* (2013.01); *B60W 2555/20* (2020.02); *B60W 2556/45* (2020.02)

(58) Field of Classification Search
CPC ........... B60W 2050/146; G08G 1/0116; G08G 1/0141; G08G 1/096775
See application file for complete search history.

(56) References Cited

U.S. PATENT DOCUMENTS

| | | | | |
|---|---|---|---|---|
| 2013/0311014 | A1* | 11/2013 | Matusiak | B61C 17/12 701/19 |
| 2017/0072851 | A1* | 3/2017 | Shenoy | G08G 1/096775 |
| 2018/0086339 | A1 | 3/2018 | Hanna | |
| 2018/0222388 | A1* | 8/2018 | Shenoy | G08G 1/0112 |
| 2019/0071074 | A1 | 3/2019 | Gokan et al. | |
| 2019/0079659 | A1 | 3/2019 | Adenwala et al. | |
| 2019/0141134 | A1* | 5/2019 | Hu | H04L 65/1069 |
| 2019/0302761 | A1 | 10/2019 | Huang et al. | |
| 2020/0327345 | A1* | 10/2020 | Schumacher | G06V 20/597 |
| 2021/0197804 | A1* | 7/2021 | Wu | B60W 30/0956 |
| 2022/0089181 | A1 | 3/2022 | Gross et al. | |
| 2022/0153273 | A1* | 5/2022 | Metli | B60W 30/18154 |
| 2022/0324421 | A1* | 10/2022 | Giovanardi | G08G 1/0145 |
| 2023/0278549 | A1* | 9/2023 | Onitsuka | B60W 10/06 701/36 |
| 2023/0325706 | A1* | 10/2023 | Kesavareddigari | H04B 7/088 706/12 |
| 2024/0270285 | A1* | 8/2024 | Ucar | B60W 30/0956 |

* cited by examiner

400

Aggregated Data Set 402

| Event Reference | Event Type | Location | Road Data | Weather at Location |
|---|---|---|---|---|
| 1 | Detected object - pedestrian | 41.877631, -87.626964 | Highway; 110 kph speed limit | Rain |
| 2 | Detected object - cylist | 41.877617, -87.626073 | Highway; 100 kph speed limit | Fog |
| 3 | Harsh braking reported | 41.878862, -87.629357 | Local Road; 75 kph speed limit | Rain |
| 4 | Wheel slippage reported | 41.876468, -87.629262 | Local Road; 55 kph speed limit | Rain |

⋮

450.1

| Event | Rule Parameters | Rule conditions | Updated ADAS Configuration Settings |
|---|---|---|---|
| 1 | Vehicle Location and direction with respect to alert event | When the vehicle route intersects with the location of Event 1 | Generate pedstrian warning AND/OR |
| | Road Data at alert event location | When the speed limit is 110 kph or greater | Increase ADAS sensitivity to present pedstrian warning earlier |

⋮

450.2

| Event | Rule Parameters | Rule conditions | Updated ADAS Configuration Settings |
|---|---|---|---|
| ALL | Vehicle Location | When fog is present OR | Increase ADAS sensitivity to present forward collision warning (FCW) earlier |
| | Weather at alert event location | When precipitation is present | |
| | | | |

FIG. 4A

⋮

400

450.3

| Event | Rule Parameters | Rule conditions | Updated ADAS Configuration Settings |
| --- | --- | --- | --- |
| 3 | Vehicle Location and direction with respect to alert event location | When the vehicle route intersects with the location of Event 3 | Increase ADAS sensitivity to present forward collision warning (FCW) earlier |
| | Road Data at alert event location | When the road speed limit is 75 kph or greater | |
| | Weather at alert event location | When precipitation is present | |

450.4

| Event | Rule Parameters | Rule conditions | Updated ADAS Configuration Settings |
| --- | --- | --- | --- |
| 4 | Vehicle Location and direction with respect to alert event location | When the vehicle route intersects with the location of Event 4 | Generate slippery conditions warning<br>AND/OR |
| | Weather at alert event location | When snow is present | Increase ADAS sensitivity to perform more strict driver monitoring |

FIG. 4B

600
| Icon Meaning | Icon Graphic |
| --- | --- |
| Low visibility/fog | 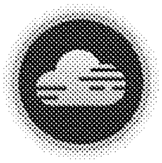 |
| Snow | 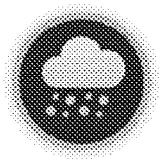 |
| Lightning | 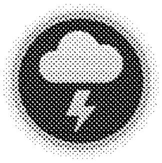 |
| High Winds | 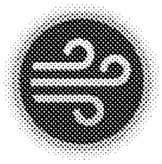 |
| Water on Road Surface | 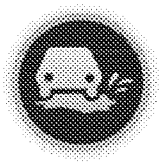 |
| General Weather Alert | 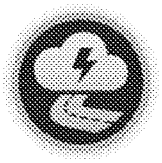 |
| Icon Meaning | Icon Graphic |
| --- | --- |
| Pedestrian on high-speed road | 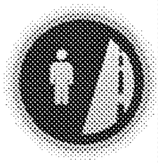 |
| Cyclist on high-speed road | 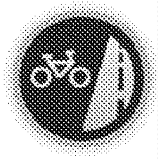 |
| High pedestrian ratio | 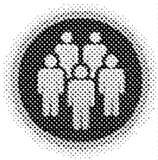 |
| Harsh braking ratio | 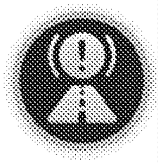 |
| Hotspot | 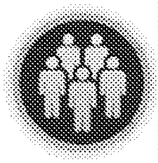 |
| Construction Zone |  |
FIG. 6

ADAPTIVE ADVANCED DRIVER-ASSISTANCE SYSTEM (ADAS)

CROSS-REFERENCE TO RELATED APPLICATIONS

This application claims priority to provisional application no. 63,326,072, filed on Mar. 31, 2022, the contents of which are incorporated herein by reference in their entirety.

TECHNICAL FIELD

This disclosure generally relates to advanced driver-assistance systems (ADASs) and, more particularly, to the implementation of an adaptive, i.e. "smart" ADAS (SADAS).

BACKGROUND

Advanced driver-assistance systems (ADAS) units function to identify objects on the road including people, signs, and light sources to keep its passengers and surrounding road users and road infrastructure safe. To do so, ADAS units use various vehicle sensors to identify ADAS alert events based upon detected objects, environmental conditions, etc., and then generate ADAS alerts to the occupants of the vehicle when specific conditions are met, which are defined by the ADAS alert sensitivity settings of the ADAS unit. However, conventional ADAS units are limited in that their ability to detect ADAS alert events is often restricted by the sensor range of the vehicle sensors. Furthermore, conventional ADAS units treat each ADAS alert event in the same manner, i.e. by applying the same ADAS alert settings to each event, regardless of other conditions that, when present, may elevate the severity of an ADAS alert event. Thus, current ADAS units fail to dynamically adapt to changes in the vehicular environment, and are inadequate in enhancing the safety of vehicle occupants.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIGS. 4A-4B illustrate example sets of rules used to implement SADAS alerts, in accordance with one or more aspects of the present disclosure;

FIG. 6 illustrates an example set of SADAS icons, in accordance with one or more aspects of the disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Autonomous Vehicle Architecture and Operation

Figure 1:
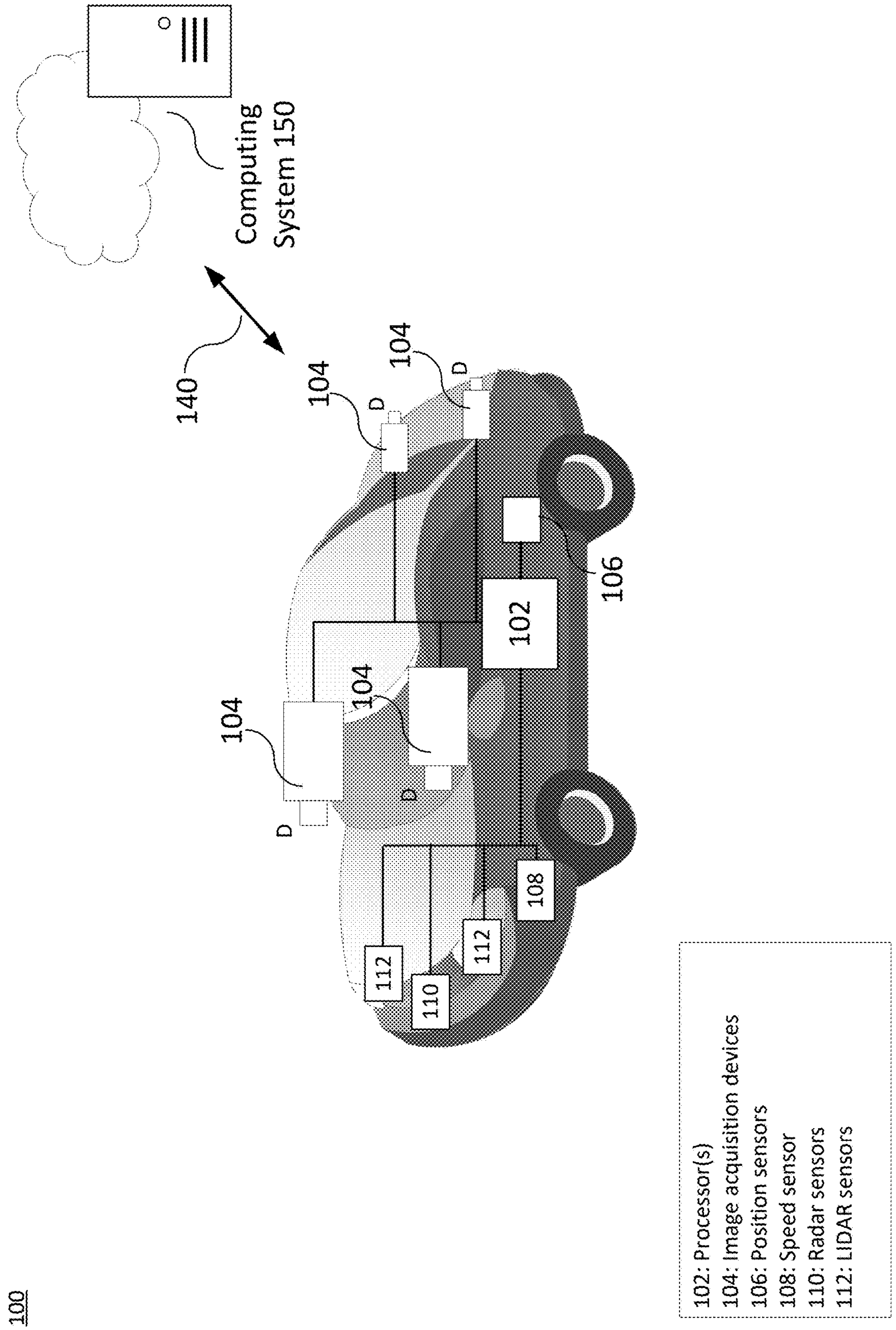
FIG. 1 illustrates an example vehicle in accordance with one or more aspects of the present disclosure.

FIG. 1 shows a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driver assistance control system, including AV and/or advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle's systems and/or part of an aftermarket system that is installed in the vehicle 100.

The one or more processors 102 may be integrated with or separate from an electronic control unit (ECU) of the vehicle 100 or an engine control unit of the vehicle 100, which may be considered herein as a specialized type of an electronic control unit. The safety system 200 may generate data to control or assist to control the ECU and/or other components of the vehicle 100 to directly or indirectly control the driving of the vehicle 100. However, the aspects described herein are not limited to implementation within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
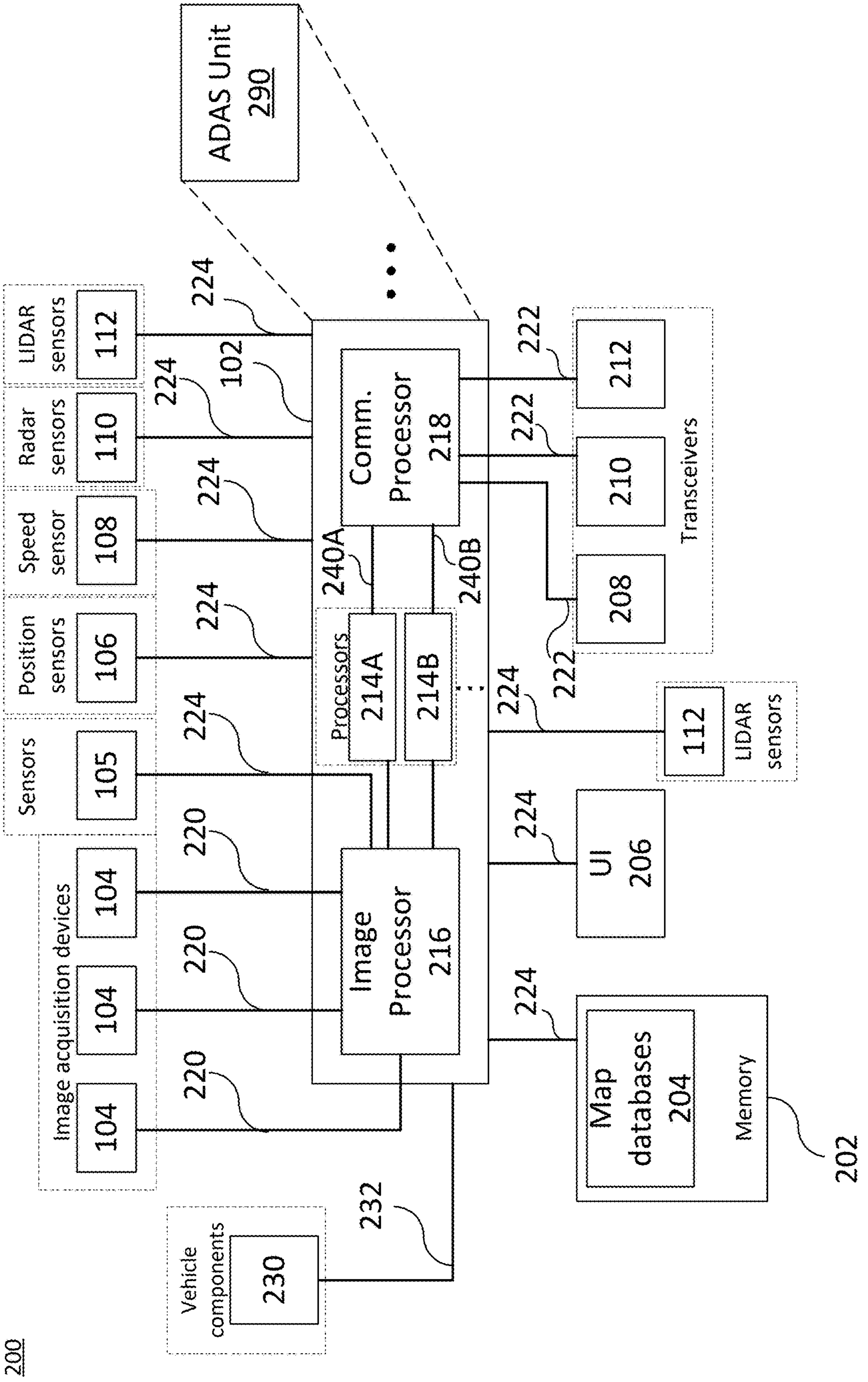
FIG. 2 illustrates various example electronic components of a safety system of a vehicle, in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more vehicle cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212. Additionally or alternatively, the one or more user interfaces 206 may be identified with other components in communication with the safety system 200, such as one or more components of an ADAS unit, an AV system, etc., as further discussed herein.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short-Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System-UMTS), a 4G (e.g. Long Term Evolution-LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™-2020, published Feb. 26, 2021 (e.g. 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices via one or more wireless links 140. This may include, for instance, communications with a remote server or other suitable computing system 150 as shown in FIG. 1. The example shown FIG. 1 illustrates such a remote computing system 150 as a cloud computing system, although this is by way of example and not limitation, and the computing system 150 may be implemented in accordance with any suitable architecture and/or network and may constitute one or several physical computers, servers, processors, etc. that comprise such a system. As another example, the remote computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors 102 and/or the safety system 200 may form the entirety of or a portion of an advanced driver-assistance system (ADAS) and, as further discussed herein, part of a "smart" ADAS unit that provide additional functionality and features.

Moreover, one or more of the processors 214A, 214B, 216, and/or 218 of the one or more processors 102 may be configured to work in cooperation with one another and/or with other components of the vehicle 100 to collect information about the environment (e.g., sensor data, such as images, depth information (for a Lidar for example), etc.). In this context, one or more of the processors 214A, 214B, 216, and/or 218 of the one or more processors 102 may be referred to as "processors." The processors can thus be implemented (independently or together) to create mapping information from the harvested data, e.g., Road Segment Data (RSD) information that may be used for Road Experience Management (REM) mapping technology, the details of which are further described below. As another example, the processors can be implemented to process mapping information (e.g. roadbook information used for REM mapping technology) received from remote servers over a wireless communication link (e.g. link 140) to localize the vehicle 100 on an AV map, which can be used by the processors to control the vehicle 100.

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any wired and/or wireless third link 224 or third links 224. Furthermore, the position sensors 106 may be coupled to each of the one or more processors 102, e.g., via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102 form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example. Of course, the application processors 214A, 214B may perform other functions in addition to or as an alternative to control-based functions, such as the various processing functions discussed herein, providing ADAS alerts, providing warnings regarding possible collisions, etc.

The one or more processors 102 may additionally be implemented to communicate with any other suitable components of the vehicle 100 to determine a state of the vehicle while driving or at any other suitable time, which may comprise an analysis of data representative of a vehicle status. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc. As another example, various metrics used to control the speed, acceleration, braking, steering, etc. may be received via the vehicle components 230, which may include receiving any suitable type of signals that are indicative of such metrics or varying degrees of how such metrics vary over time (e.g. brake force, wheel angle, reverse gear, etc.).

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective processor 214A, 214B, 216, 218, or accessed via another memory that is part of the safety system 200 or external to the safety system 200. This memory may include the one or more memories 202. Regardless of the particular type and location of memory, the memory may store software and/or executable (i.e. computer-readable) instructions that, when executed by a relevant processor (e.g., by the one or more processors 102, one or more of the processors 214A, 214B, 216, 218, etc.), controls the operation of the safety system 200 and may perform other functions such those identified with the aspects described in further detail below. As one example, the one or more processors 102, which may include one or more of the processors 214A, 214B, 216, 218, etc., may execute the computer-readable instructions to perform one or more smart ADAS functions as discussed herein.

A relevant memory accessed by the one or more processors 214A, 214B, 216, 218 (e.g. the one or more memories 202) may also store one or more databases and image processing software, as well as a trained system, such as a neural network, or a deep neural network, for example, that may be utilized to perform the tasks in accordance with any of the aspects as discussed herein. A relevant memory accessed by the one or more processors 214A, 214B, 216, 218 (e.g. the one or more memories 202) may be implemented as any suitable number and/or type of non-transitory computer-readable medium such as random-access memories, read only memories, flash memories, disk drives, optical storage, tape storage, removable storage, or any other suitable types of storage.

The components associated with the safety system 200 as shown in FIG. 2 are illustrated for ease of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions. Again, such a controller or system may be configured as an ADAS unit configured to perform functions related to determining whether to adjust an ADAS alert sensitivity configuration, when to present ADAS alert notifications, etc., as discussed in further detail herein, to present relevant warnings and/or to control of the state of the vehicle 100 in which the safety system 200 is implemented.

In some aspects, the safety system 200 may further include components such as a speed sensor 108 (e.g. a speedometer) for measuring a speed of the vehicle 100. The safety system 200 may also include one or more inertial measurement unit (IMU) sensors such as e.g. accelerometers, magnetometers, and/or gyroscopes (either single axis or multiaxis) for measuring accelerations of the vehicle 100 along one or more axes, and additionally or alternatively one or more gyro sensors, which may be implemented for instance to calculate the vehicle's ego-motion as discussed herein, alone or in combination with other suitable vehicle sensors. These IMU sensors may, for example, be part of the position sensors 105 as discussed herein. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (e.g., one or more links 224) may couple the speed sensor 108, the one or more radar sensors 110, and the one or more LIDAR sensors 112 to at least one of the one or more processors 102.

Autonomous Vehicle (AV) Map Data and Road Experience Management (REM)

Data referred to as REM map data (or alternatively as roadbook map data), may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. It is noted that although referred to herein as "AV map data," the data may be implemented in any suitable vehicle platform, which may include vehicles having any suitable level of automation (e.g. levels 0-5), as noted above.

Regardless of where the AV map data is stored and/or accessed, the AV map data may include a geographic location of known landmarks that are readily identifiable in the navigated environment in which the vehicle 100 travels. The location of the landmarks may be generated from a historical accumulation from other vehicles driving on the same road that collect data regarding the appearance and/or location of landmarks (e.g. "crowd sourcing"). Thus, each landmark may be correlated to a set of predetermined geographic coordinates that has already been established. Therefore, in addition to the use of location-based sensors such as GNSS, the database of landmarks provided by the AV map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions.

Furthermore, and as noted above, the vehicle 100 may determine its own motion, which is referred to as "ego-motion." Ego-motion is generally used for computer vision algorithms and other similar algorithms to represent the motion of a vehicle camera across a plurality of frames, which provides a baseline (i.e. a spatial relationship) that can be used to compute the 3D structure of a scene from respective images. The vehicle 100 may analyze the ego-motion to determine the position and orientation of the vehicle 100 with respect to the identified known landmarks. Because the landmarks are identified with predetermined geographic coordinates, the vehicle 100 may determine its position on a map based upon a determination of its position with respect to identified landmarks using the landmark-correlated geographic coordinates. Doing so provides distinct advantages that combine the benefits of smaller scale position tracking with the reliability of GNSS positioning systems while avoiding the disadvantages of both systems. It is further noted that the analysis of ego motion in this manner is one example of an algorithm that may be implemented with monocular imaging to determine a relationship between a vehicle's location and the known location of known landmark(s), thus assisting the vehicle to localize itself. However, ego-motion is not necessary or relevant for other types of technologies, and therefore is not essential for localizing using monocular imaging. Thus, in accordance with the aspects as described herein, the vehicle 100 may leverage any suitable type of localization technology.

Thus, the AV map data is generally constructed as part of a series of steps, which may involve any suitable number of vehicles that opt into the data collection process. For instance, Road Segment Data (RSD) is collected as part of a harvesting step. As each vehicle collects data, the data is classified into tagged data points, which are then transmitted to the cloud or to another suitable external location. A suitable computing device (e.g. a cloud server) then analyzes the data points from individual drives on the same road, and aggregates and aligns these data points with one another. After alignment has been performed, the data points are used to define a precise outline of the road infrastructure. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the AV map data. This information is then compiled into a Roadbook Map, which constitutes a bank of driving paths, semantic road information such as features and objects, and aggregated driving behavior.

A map database 204, which may be stored as part of the one or more memories 202 or accessed via the computing system 150 via the link(s) 140, for instance, may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the AV map data, which includes data relating to the position, in a reference coordinate system, of various landmarks such as objects and other items of information, including roads, water features, geographic features, businesses, points of interest, restaurants, gas stations, etc.

The map database 204 may thus store, as part of the AV map data, not only the locations of such landmarks, but also descriptors relating to those landmarks, including, for example, names associated with any of the stored features, and may also store information relating to details of the items such as a precise position and orientation of items. In some cases, the AV map data may store a sparse data model including polynomial representations of certain road features (e.g., lane markings) or target trajectories for the vehicle 100. The AV map data may also include stored representations of various recognized landmarks that may be provided to determine or update a known position of the vehicle 100 with respect to a target trajectory. The landmark representations may include data fields such as landmark type, landmark location, etc., among other potential identifiers. The AV map data may also include non-semantic features including point clouds of certain objects or features in the environment, and feature point and descriptors.

The map database 204 may be augmented with data in addition to the AV map data, and/or the map database 204 and/or the AV map data may reside partially or entirely as part of the remote computing system 150. As discussed herein, the location of known landmarks and map database information, which may be stored in the map database 204 and/or the remote computing system 150, may form what is referred to herein as "AV map data," "REM map data" or "Roadbook Map data." The one or more processors 102 may process sensory information (such as images, radar signals, depth information from LIDAR or stereo processing of two or more images) of the environment of the vehicle 100 together with position information, such as GPS coordinates, the vehicle's ego-motion, etc., to determine a current location, position, and/or orientation of the vehicle 100 relative to the known landmarks by using information contained in the AV map. The determination of the vehicle's location may thus be refined in this manner. Certain aspects of this technology may additionally or alternatively be included in a localization technology such as a mapping and routing model.

Safety Driving Model

Furthermore, the safety system 200 may implement a safety driving model or SDM (also referred to as a "driving policy model," "driving policy," or simply as a "driving model"), e.g., which may be utilized and/or executed as part of the ADAS system as discussed herein. By way of example, the safety system 200 may include (e.g. as part of the driving policy) a computer implementation of a formal model such as a safety driving model. A safety driving model may include an implementation of a mathematical model formalizing an interpretation of applicable laws, standards, policies, etc. that are applicable to self-driving (e.g., ground) vehicles. In some embodiments, the SDM may comprise a standardized driving policy such as the Responsibility Sensitivity Safety (RSS) model. However, the embodiments are not limited to this particular example, and the SDM may be implemented using any suitable driving policy model that defines various safety parameters that the AV should comply with to facilitate safe driving.

For instance, the SDM may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a safety driving model (e.g. the vehicle 100) may be or include an implementation of a mathematical model for safety assurance that enables identification and performance of proper responses to dangerous situations such that self-perpetrated accidents can be avoided.

A safety driving model may implement logic to apply driving behavior rules such as the following five rules:

- Do not hit someone from behind.
- Do not cut-in recklessly.
- Right-of-way is given, not taken.
- Be careful of areas with limited visibility.
- If you can avoid an accident without causing another one, you must do it.

It is to be noted that these rules are not limiting and not exclusive, and can be amended in various aspects as desired. The rules thus represent a social driving "contract" that might be different depending upon the region, and may also develop over time. While these five rules are currently applicable in most countries, the rules may not be complete or the same in each region or country and may be amended.

As described above, the vehicle 100 may include the safety system 200 as also described with reference to FIG. 2. Thus, the safety system 200 may generate data to control or assist to control the ECU of the vehicle 100 and/or other components of the vehicle 100 to directly or indirectly navigate and/or control the driving operation of the vehicle 100, such navigation including driving the vehicle 100 or other suitable operations as further discussed herein. This navigation may optionally include adjusting one or more SDM parameters, which may occur in response to the detection of any suitable type of feedback that is obtained via image processing, sensor measurements, etc. The feedback used for this purpose may be collectively referred to herein as "environmental data measurements" and include any suitable type of data that identifies a state associated with the external environment, the vehicle occupants, the vehicle 100, and/or the cabin environment of the vehicle 100, etc.

For instance, the environmental data measurements may be used to identify a longitudinal and/or lateral distance between the vehicle 100 and other vehicles, the presence of objects in the road, the location of hazards, etc. The environmental data measurements may be obtained and/or be the result of an analysis of data acquired via any suitable components of the vehicle 100, such as the one or more image acquisition devices 104, the one or more sensors 105, the position sensors 106, the speed sensor 108, the one or more radar sensors 110, the one or more LIDAR sensors 112, etc. To provide an illustrative example, the environmental data may be used to generate an environmental model based upon any suitable combination of the environmental data measurements. Thus, the vehicle 100 may utilize the tasks performed via trained model(s) to perform various navigation-related operations within the framework of the driving policy model.

The navigation-related operation may be performed, for instance, by generating the environmental model and using the driving policy model in conjunction with the environmental model to determine an action to be carried out by the vehicle. That is, the driving policy model may be applied based upon the environmental model to determine one or more actions (e.g. navigation-related operations) to be carried out by the vehicle. The SDM can be used in conjunction (as part of or as an added layer) with the driving policy model to assure a safety of an action to be carried out by the vehicle at any given instant. For example, the ADAS may leverage or reference the SDM parameters defined by the safety driving model to determine navigation-related operations of the vehicle 100 in accordance with the environmental data measurements depending upon the particular scenario. The navigation-related operations may thus cause the vehicle 100 to execute a specific action based upon the environmental model to comply with the SDM parameters defined by the SDM model as discussed herein. For instance, navigation-related operations may include steering the vehicle 100, changing an acceleration and/or velocity of the vehicle 100, executing predetermined trajectory maneuvers, etc. In other words, the environmental model may be generated at least in part on sensor data received via the various sensors of the vehicle 100 as noted herein, and the applicable driving policy model may then be applied together with the environmental model to determine a navigation-related operation to be performed by the vehicle.

An Example Smart ADAS

The aspects as discussed herein provide enhanced or smart ADAS functionality. For instance, an in-vehicle ADAS unit 290 may be implemented as discussed above as the one or more processors 102 and/or other suitable components of the safety system 200. For example, an ADAS unit 290 as discussed herein (also referred to herein simply as an ADAS 290) may be implemented via the one or more of the processors 214A, 214B, 216, and/or 218 of the one or more processors 102, and may perform any of the functions as described herein via execution of any suitable computer-readable instructions stored in a relevant memory that is accessed by the one or more processors 102, 214A, 214B, 216, 218, etc. (e.g. the one or more memories 202).

In accordance with the aspects as discussed herein, the ADAS unit 290 may adjust an ADAS alert sensitivity in response to data received from a remote computing device (e.g. the remote computing device 150) when one or more alert-based conditions have been met (e.g. the proximity of an ADAS alert event, the vehicle 100 navigating a route that will intersect with an ADAS alert event, etc.), which may function to enhance safety. As further discussed herein, the sensitivity of the ADAS unit 290 may be adjusted based upon changes in the weather, other ADAS alert events that have been reported by other vehicle ADAS units. Additionally or alternatively, the ADAS unit 290 may adjust the ADAS alert sensitivity based on ADAS alert events collected from various sources, such as crowd sourcing, environment condition sensing, road conditions, any suitable third party geolocation services, etc.

To achieve an adjustment to ADAS alert sensitivity, it is noted that the ADAS unit 290 operates in accordance with a set of ADAS parameters, which together define a respective ADAS sensitivity configuration with respect to how the ADAS unit 290 responds to specific alert-based conditions being met. For example, ADAS parameters may comprise alert threshold time periods identified with various types of detected ADAS alert events. Continuing this example, an ADAS alert event may comprise a forward collision warning (FCW). Thus, in this example an FCW alert is displayed when the alert-based condition is met, which includes a projected time to collision (TTC) of the vehicle 100 with another vehicle being less than a defined threshold time period, i.e. the alert threshold time period in this example. Thus, when the alert threshold time period is adjusted in accordance with an increased ADAS alert sensitivity configuration, the alert threshold time period is increased, and the FCW alert will be displayed earlier to the driver, thereby enhancing safety.

As another example, the ADAS parameters may alternatively define metrics other than time-based ones, such as distance-based metrics, for example. Thus, ADAS parameters may comprise alert threshold distances identified with various types of detected ADAS alert events. Continuing this example, an ADAS alert event may comprise a lane departure warning (LDW). Thus, in this example, an LDW alert is displayed when the alert-based condition is met, which includes the vehicle deviating outside a lane marker without signaling greater than a defined threshold deviation distance, i.e. the alert threshold distance. When this alert threshold distance is adjusted in accordance with an increased sensitivity configuration, such that the alert threshold distance is decreased, the LDW alert will be displayed earlier to the driver, thereby enhancing safety.

Although a time- and distance-based ADAS parameter are provided above, these are by way of example, and the embodiments described herein may function to adjust an ADAS sensitivity configuration in accordance with any suitable number and/or type of ADAS parameters, and may do so in response to any suitable number and type of conditions being met, as further discussed herein.

In any event, the smart ADAS unit 290 as discussed herein facilitates a dynamic adjustment of various ADAS parameters based upon a remote data analysis of an aggregated data set. This aggregated data set may include data that is reported by several vehicle ADAS units over a large geographic region, and which results in the generation of a data message that is transmitted to one or more vehicles that are present within a particular service region. The remote data analysis may include the generation of instructions in accordance with a predetermined set of rules. The instructions, which are included in the messages transmitted to the vehicles, indicate to each vehicle ADAS unit how to determine whether the sensitivity of a vehicle ADAS unit should be adjusted on a per ADAS alert event basis. The aggregated data set may me the result of crowdsourcing data reported by other vehicles, which may also function as the source for identifying the ADAS alert events. Upon receiving the message from the remote computing system, the local ADAS unit 290 of each vehicle may then selectively perform a dynamic adjustment of the ADAS alert sensitivity settings. This may be performed, for example, via the ADAS unit 290 updating the ADAS parameters as noted above and/or adjusting how the ADAS unit 290 determines whether ADAS alerts are to be presented, which may be done in advance or even before the vehicle reaches a particular warning area.

An Example Smart ADAS Architecture

Figure 3:
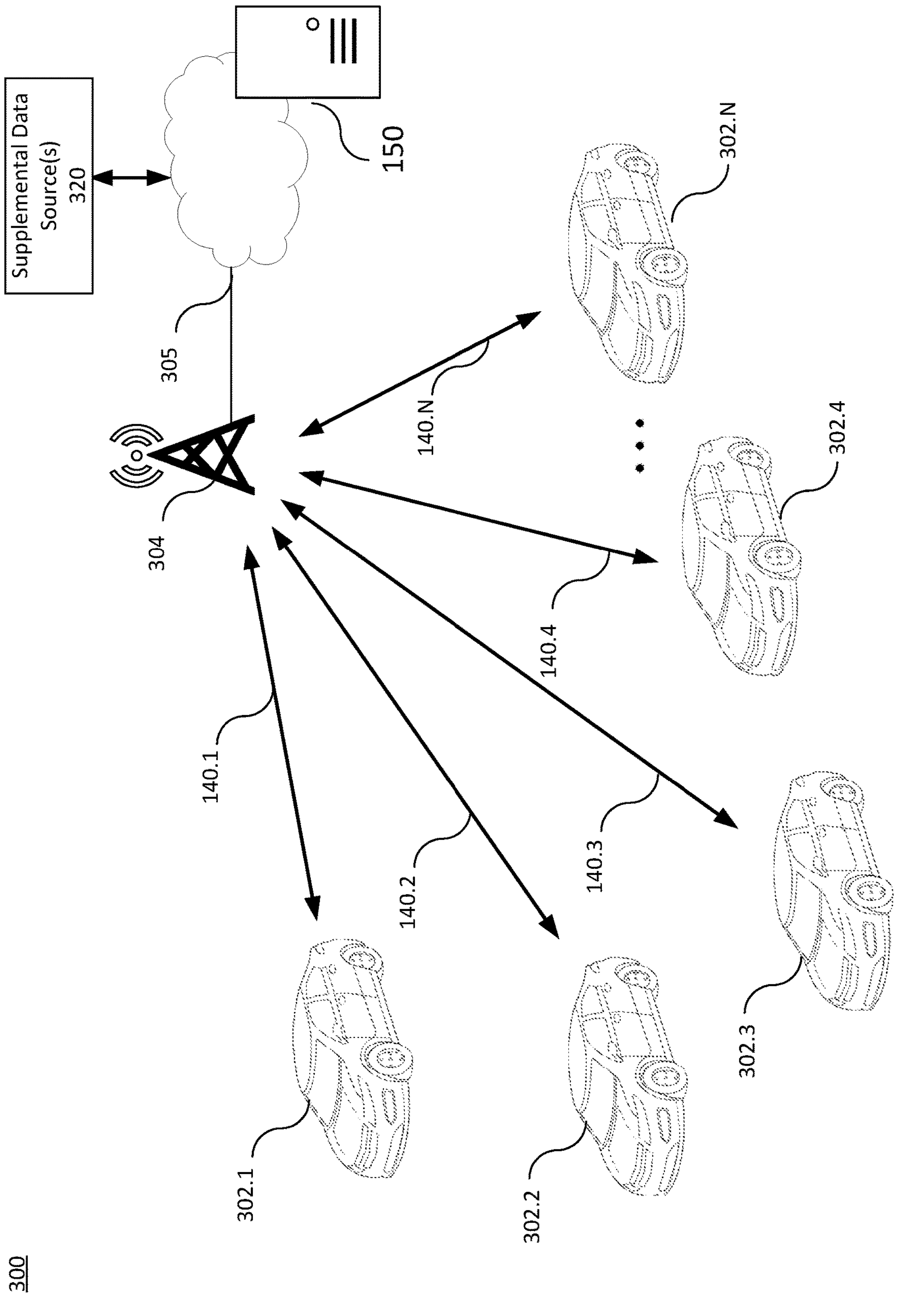
FIG. 3 illustrates an example architecture used to implement smart ADAS (SADAS) alerts, in accordance with one or more aspects of the present disclosure.

FIG. 3 illustrates an example architecture used to implement smart ADAS alerts, in accordance with one or more aspects of the present disclosure. As shown in FIG. 3, the example architecture 300 includes any suitable number N of vehicles 302.1-302.N, which communicate with a remote computing system 150 via wireless infrastructure 304. Each of the vehicles 302.1-302.N may implement any suitable number and/or type of components, such as those discussed above with reference to the vehicle 100, for example. Thus, each of the vehicles 302.1-302.N may comprise a safety system 200 and/or an ADAS unit 290, which may be configured to perform the smart ADAS functions as further discussed herein. Moreover, each of the vehicles 302.1-302.N may be configured with different levels of ADAS and/or AV functionality. For example, some of the vehicles 302.1-302.N may be configured with sensors configured to enable the respective vehicle 302 to perform object detection, whereas other vehicles 302.1-302.N may not be configured to perform such functions. In this way, the smart ADAS functionality as discussed in further detail herein may, in some scenarios, enhance or augment the functionality of a vehicle ADAS unit by providing an ADAS unit with information that may otherwise not be detectable via the vehicle's onboard sensor suite.

In an embodiment, each of the vehicles 302.1-302.N may be configured to communicate with the remote computing system 150 via any suitable number and/or type of wireless infrastructure, which is represented in FIG. 3 as the wireless infrastructure 304. Thus, the wireless infrastructure 304 may comprise part of a cellular or other suitable wireless network, and comprise any suitable umber of macro cells, femtocells, microcells, picocells, small cells, smart roadside infrastructure, an edge computing system and/or network, etc. The wireless infrastructure 304 is communicatively coupled to the remote computing device via the link 305, which may represent any suitable number and/or type of wired and/or wireless links, wires, telephone lines, relay hops, etc. The wireless infrastructure 304 is also communicatively coupled to each of the vehicles 302.1-302.N via respective links 140.1-140.N, which may be identified with the link 140 as discussed above. Thus, the wireless infrastructure 304 is configured to enable each of the vehicles 302.1-302.N to transmit data to and receive data from the remote computing device 150, thereby facilitating bidirectional data communications between the vehicles 302.1-302.N and the remote computing device 150.

Again, the remote computing system 150 may be implemented in accordance with any suitable architecture and/or network, and may constitute one or several physical computers, servers, processors, etc. that comprise such a system. In an embodiment, the remote computing system 150 may comprise any suitable type of memory, e.g. a non-transitory computer-readable medium, which may store computer-readable instructions that, when executed, enable the remote computing system 150 to perform the smart ADAS related functions as discussed herein. For example, the remote computing system 150 may execute a smart ADAS algorithm to generate messages that are transmitted to one or more of the vehicles 302.1-302.N via the respective links 104.1-104.N, which are indicative of an adjusted ADAS alert sensitivity configuration. Each vehicle 302.1-302.N may thus receive such messages and selectively adjust one or more ADAS parameters based upon whether an ADAS alert event is relevant to that vehicle, as further discussed herein.

To do so, the remote computing system 150 may receive data messages transmitted by any suitable number of the vehicles 302.1-302.N while navigating within a coverage region, as well as any other suitable data sources that may be configured to monitor and report data regarding a particular driving environment such as smart infrastructure, for example. These data messages may be alternatively referred to herein simply as data (e.g. first data) or as vehicle ADAS messages. It is noted that although the term "vehicle ADAS messages" is used herein, it is understood that this is by way of example and not limitation, as the data transmitted to the remote computing system 150 as discussed herein may additionally or alternatively be transmitted via any suitable component that is configured to collect and transmit such data (e.g. smart infrastructure). Moreover, although FIG. 3 illustrates each of the vehicles 302.1-302.N being serviced by a single wireless infrastructure 304, this is for ease of explanation, and it will be understood that the wireless infrastructure 304 may represent several cells or coverage regions, each being configured to receive the data messages from the respective vehicles 302.1-302.N within a suitable range. In any event, the remote computing device 150 is configured to receive vehicle ADAS messages from any suitable number of the vehicles 302.1-302.N or other suitable components that are currently within or have previously navigated a service region, which may be a predetermined size and/or shape.

Again, each of the vehicles 302.1-302.N may transmit a respective vehicle ADAS message in accordance with any suitable type of communication protocol. The vehicle ADAS messages may, for example, be transmitted via the wireless transceivers 208, 210, 212 of the safety system 200, as discussed above, or via any suitable components of a respective vehicle 302.1-302.N. The vehicle messages may be transmitted continuously or in accordance with any suitable periodic transmission schedule, e.g. every 10 seconds, every 20 seconds, etc. The periodicity of the transmission schedule may be predetermined, configurable, and/or conditioned upon any suitable type of relevant metrics, such as the speed of the vehicle and/or the location of the vehicle, for example. As one illustrative example, a vehicle 302.1-302.N may increase its vehicle ADAS message transmission frequency when the vehicle is in an urban or more densely populated environment, recognizing that there may be a larger incidence of detected ADAS events to report. Such decisions may include the ADAS unit 290 of the vehicle 100 (or other suitable components such as the one or more processors 102, for instance) utilizing geofencing techniques, for instance, to determine whether the vehicle 100 is in an area that triggers the vehicle ADAS message transmission frequency adjustment. Additionally or alternatively, the vehicles 302.1-302.N may transmit their respective vehicle ADAS messages as new ADAS events are detected and/or when ADAS events are detected matching a predetermined type (e.g. when a traffic jam is detected, when a pedestrian is detected in a high speed road, etc.).

In any event, the vehicle ADAS messages may contain any suitable amount of data, which may be contained as part of an ADAS payload. The data contained in the ADAS payload may be a function of the particular capabilities of the ADAS unit 290 of each vehicle 302.1-302.N. For example, a vehicle ADAS message may contain a payload with data that identifies a location of the vehicle transmitting the vehicle ADAS message. The location of the vehicle 302 may be represented via a geolocation (e.g. acquired via a GNSS of the vehicle 302) or, alternatively, a location that is referenced to one or more AV map features. Additionally or alternatively, the vehicle ADAS message may contain an ADAS payload including data that identifies ADAS alert events detected by the vehicle 302 transmitting the ADAS message and/or a current vehicle configuration. Still further, the vehicle ADAS messages may additionally or alternatively contain aggregated road data, which may identify a type of road upon which the vehicle is travelling and/or metrics identified with the road. For instance, the road data may be static in nature, indicating a road type (e.g. paved, highway, one way street, etc.) and/or be dynamic in nature (e.g. indicating changes in road conditions, road construction, etc.).

The remote computing system 150 is configured to aggregate data from any suitable number of data sources to form an aggregated data set. The remote computing system 150 is configured to use the aggregated data set in accordance with the predetermined rules to instruct, on a per ADAS alert event basis, each vehicle with respect to whether that vehicle should adjust the ADAS sensitivity settings when encountering that specific ADAS alert event. The aggregated data set may include, for example, data obtained via the vehicle ADAS messages, which may contain any suitable type of information reported by each vehicle ADAS unit. For example, the vehicle ADAS messages may identify the ADAS alert events detected by each respective vehicle 302.1-302.N (or the ADAS unit thereof), a location of each ADAS alert event, and a current vehicle configuration. The current vehicle configuration may include, for example, the current ADAS configuration and sensitivity settings, and may additionally or alternatively include any other suitable information regarding the operation and capabilities of the vehicle and/or the ADAS unit.

Additionally or alternatively, the remote computing system 150 may be configured to obtain data from any suitable number of data sources other than the vehicles 302.1-302.N. The data obtained from these additional data sources may also be included as part of the aggregated data set, and may be used in accordance with the predetermined rules as noted herein. These data sources are represented in FIG. 3 as the supplemental data source(s) 320, and may represent dynamically changing data provided from one or more suitable data sources such as weather providers, traffic data providers, map data providers, etc. The remote computing system 150 may thus access and process this aggregated data to determine, in accordance with the predetermined rules, whether a vehicle should adjust the ADAS sensitivity settings when encountering that specific ADAS alert event. In this way, the smart ADAS of the vehicle 100 enables other nearby vehicles (or other suitable road users) to change and increase the sensitivity of their ADAS alerts according to the predetermined rules.

Thus, the remote computing system 150 uses the vehicle ADAS messages to generate the messages that are transmitted to one or more of the vehicles 302.1-302.N via the respective links 104.1-104.N, which are indicative of the rules, conditions, and the accompanying adjusted ADAS sensitivity configuration, as noted above. The messages transmitted from the remote computing system 150 to one or more of the vehicles 302.1-302.N may be alternatively referred to herein simply as data (e.g. second data) or as ADAS configuration messages. The nature of the vehicle ADAS messages and the ADAS configuration messages are discussed in further detail below.

The ADAS alert events as discussed herein may comprise any suitable type of events that have been detected by the vehicle ADAS unit 290 and/or received, processed, and/or otherwise identified via the vehicle and/or the ADAS unit 290 of the vehicle. To provide some illustrative examples, ADAS alert events may comprise the general weather conditions at the vehicle's location, or may comprise weather alerts and/or more detailed weather-based conditions such as visibility, precipitation, lightning, high winds, water on the road (e.g. puddles), fog, snow, icy conditions, etc.

To provide some additional illustrative examples, ADAS alert events may comprise object-based ADAS alert events that are associated with various objects detected by the vehicle ADAS unit 290. Such object-based ADAS alert events may include, for instance, the detection of a vulnerable road user (VRU) such as a pedestrian or a cyclist. To provide further illustrative examples, ADAS alert events may comprise triggered ADAS alerts that have been issued by the ADAS unit 290 of the vehicle in response to certain conditions being met, such as the detection of harsh braking, a lane change warning (LCW), a driver management system (DMS) detecting driver inattentiveness, a forward collision warning (FCW) being detected, etc. Thus, the embodiments herein include the ADAS alert events being identified with any suitable type of event that may be detected by the vehicle 302.1-302.N, via an ADAS unit of a vehicle, the remote computing system 150 via the supplemental data source(s) 150, or via any other suitable data source(s) and/or component(s). The ADASA alert events may comprise any suitable events that may have a safety impact on or otherwise be relevant to the safety of the vehicle and/or other road users, and/or be relevant for the issuance of future ADAS events by other vehicles sharing the same driving environment. Thus, the ADAS alert events that may be transmitted as part of the vehicle ADAS messages may or may not have triggered an ADAS alert to be issued by the vehicle transmitting that message.

Furthermore, the current ADAS configuration information that may be provided as part of the vehicle ADAS messages may include any suitable type of information identified with the ADAS unit 290 of each respective vehicle 302.1-302.N. This may include, for example, the set of ADAS parameters and/or capabilities of the ADAS unit 290, the type of warnings that may be issued, vehicle information, driver information, etc. The current ADAS sensitivity settings, which may additionally or alternatively be provided as part of the vehicle ADAS messages, may comprise information regarding the respective vehicle's sensitivity configuration, which may indicate the current time and/or distance-based thresholds identified with corresponding alert-based conditions as noted herein that, when met, result in the ADAS alert being issued. As further discussed herein, the subsequent ADAS configuration messages received via the remote computing device 150 cause the ADAS unit 290 to selectively adjust its ADAS parameters in accordance with the adjusted ADAS alert sensitivity configuration. This may cause subsequent ADAS alerts to be issued by the vehicle's ADAS unit 290 using the updated ADAS alert sensitivity configuration, e.g. if further conditions are met, as further discussed herein.

To generate the ADAS configuration messages, the remote computing device 150 receives the vehicle ADAS messages transmitted by each of the vehicles 302.1-302.N within a service area as noted above, and may use the data contained in the ADAS payload of each vehicle ADAS alert message to generate an aggregated data set. In other words, the remote computing device 150 is configured to aggregate the data received from one or more of the vehicles (via the transmitted vehicle ADAS messages) and/or any data received via the supplemental data source(s) 320 to generate an aggregated data set. The various types of supplemental data used in this manner may be set in accordance with a predetermined configuration, for example.

An example of an aggregated data set 402 is shown in FIG. 4A, which comprises the ADAS alert events detected by one or more of the vehicles 302.1-302.N and/or determined via the remote computing system 150, along with a reported geographic location of each one of the detected ADAS alert events. It is noted that depending upon the type of ADAS alert event, several instances of ADAS events may be identified from several vehicles in the same vicinity as one another, e.g. a threshold number of ADAS alert events reported via vehicles 302.1-302.N that occupy a region having a predetermined size, shape, radius, etc. When these threshold conditions are met, the remote computing system 150 may thus identify the ADAS alert event at a particular location based upon the location of each individual ADAS alert event that is reported by each vehicle ADAS unit. Examples of such ADAS alert events may comprise high traffic density, a high ratio of pedestrians, a high ratio of harsh braking (e.g. multiple instances reported), etc.

In the event that multiple ADAS alert events are reported by multiple vehicles, the remote computing device 150 may use an average of locations, a center location among the reported locations, selecting the nearest road location to the reported ADAS alert event locations, randomly select one of the ADAS alert events, or utilize any suitable computations to identify the location of such ADAS alert events. As shown in FIG. 4A, the aggregated data set 402 also comprises road data and weather information at each ADAS alert event location, which again may be derived from the transmitted vehicle ADAS messages and/or via the supplemental data source(s) 320.

The aggregated data set 402 may therefore contain information that may function to distill multiple ADAS alert events reported over a large service area, which have been received from any suitable number of vehicles, and includes data indicating the type and location of ADAS alert events within the service area. The aggregated data set may contain additional, fewer, or alternate information than the illustrative example as shown in FIG. 4A. The data contained in the aggregated data set 402 may thus change over time as new ADAS alert events are reported, weather conditions change, vehicles move in and out of the service area, etc. Once the aggregated data set is generated in this manner, the remote computing system 150 uses the aggregated data set 402 in accordance with a set of predetermined rules that define, for each detected ADAS alert event and the respective location, a corresponding ADAS sensitivity configuration. The application of this set of predetermined rules results in the generation of an ADAS configuration message that is then transmitted to a specific vehicle 302.1-302.N, and provides that vehicle with instructions regarding if, when, and how the ADAS configuration settings should be adjusted.

In other words, the remote computing system 150 may execute a smart ADAS (SADAS) algorithm by processing the aggregated data set 402, which may contain data transmitted via any suitable number of vehicles within a suitable service range, as well as other supplemental data sources 320 as discussed herein. The aggregated data set 402 may therefore include any suitable type of data that may facilitate the generation of ADAS configuration messages, and which may identify or be used to identify ADAS alert events. For example, the aggregated data 402 may include data transmitted by other vehicles, data with respect to various "hot-spots" (e.g. high density pedestrian or vehicular traffic), AV map data and/or any features derived from the AV map data, weather data, road data, etc., as well as a corresponding location identified with each set of data.

Moreover, the remote computing system 150 may optionally include, in the transmitted ADAS configuration messages, a portion of the aggregated data set 402 that identifies the ADAS alert events for which the updated ADAS configuration settings may be applicable. The portion of the aggregated data set 402 may be selected, for instance, to identify ADAS alert events and any other portion of the aggregated data set 402 for each ADAS alert event having a location that is within a threshold distance from the vehicle to which the ADAS configuration message is transmitted. In this way, the transmitted ADAS configuration message may indicate an ADAS sensitivity configuration to be potentially used by the ADAS unit 290 of a vehicle based upon the location of the vehicle. For instance, the ADAS configuration messages may identify an ADAS alert sensitivity configuration and the corresponding conditions (i.e. the rule parameters to be met) for the vehicle ADAS unit 290 to adjust its ADAS alert sensitivity configuration per each ADAS alert event within the threshold distance of the vehicle receiving the ADA configuration message.

It is noted that although referred to herein as "configuration messages," the ADAS configuration messages need not indicate any parameters of the ADAS configuration sensitivity settings to be adjusted. Instead, the ADAS configuration messages may represent "smart" notifications regarding detected ADAS alert events that have been detected by way of an analysis of data included in the aggregated data set 402. For example, a vehicle ADAS unit 290 may not be equipped to detect weather events, and thus the remote computing system 150 may transmit the ADAS configuration message to a vehicle within a threshold distance of a detected weather event. Upon receiving such an ADAS configuration message, the ADAS unit 290 may cause the corresponding notification to be presented with or without a further determination of whether the alert event is relevant for that vehicle. In other words, the remote computing system 150 may, in some embodiments, transmit ADAS configuration messages having a specific data payload that is recognized by the receiving ADAS unit 290 of a vehicle as already being relevant to that vehicle, and thus in response the ADAS unit 290 may display the notification in accordance with the message contents. In this way, a vehicle's current ADAS abilities may be supplemented via the use of the received ADAS configuration messages.

Turning now to the use of the predetermined rule sets, an example rule set 450.1 as shown in FIG. 4A may define, for any vehicle within a threshold distance of the location of the ADAS alert event 1, rule parameters that consider the vehicle location and direction with respect to the ADAS alert event, as well as the road data at the ADAS alert event location. In the illustrative example as shown in FIG. 4A, the rule conditions stipulate that a recipient vehicle of the transmitted ADAS configuration message should, upon detecting a pedestrian at the same location (i.e. within a threshold distance of the location), generate a pedestrian warning if the rule parameters are satisfied. Additionally or alternatively, the recipient vehicle should increase the ADAS sensitivity configuration to present the pedestrian warning earlier than the default scenario. The predetermined rule 450.1 may thus indicate, for each ADAS alert event corresponding to pedestrian detection in the aggregated data set 402, that either or both of these ADAS configuration settings be updated, in various embodiments.

That is, the aggregated data set 402 is used in accordance with the predetermined rule 450.1 to define corresponding sensitivity configurations for each one of the detected ADAS alert events. The remote computing system 150 may generate an ADAS configuration message that indicates that the ADAS configuration settings of a target vehicle are to be potentially adjusted. The parameters of the predefined rule 450.1, the outcome, the corresponding ADAS configuration settings, etc., may be transmitted to each vehicle as part of the ADAS configuration message when an initial condition is satisfied, e.g. when the vehicle is within a threshold range of the location of the ADAS alert event. The predefined rule 450.1 may also indicate which conditions should be met for the vehicle receiving the ADAS configuration message to adjust its ADAS alert sensitivity settings, as well as the new, updated settings that should be used. In this example, this occurs when a vehicle route (i.e. vector) intersects with the location of the ADAS alert event, and the road data indicates that the speed limit for the road at that location is 110 kph or greater. For example, the determination of whether the vehicle route intersects with the location of the ADAS alert event may additionally or alternatively be conditioned upon a threshold time period in which the vehicle is projected (at the current route, heading, and velocity) to reach a location of the ADAS alert event. For example, the vehicle ADAS unit 290 may determine that the ADAS configuration settings should be updated when the ADAS alert event is projected to be reached in a time period that is less than a contact threshold time period (e.g. 20 seconds, 30 seconds, 1 minute, etc.). In this way, the rules may be tailored to the specific capabilities of each vehicle.

In any event, the remote computing system 150 may transmit respective ADAS configuration messages to each vehicle 302.1-302.N within a threshold distance of the ADAS alert event 1, within a predetermined geographic area of the ADAS alert event 1, etc. Each ADAS configuration message indicates, for each vehicle receiving the message, a potential ADAS alert sensitivity configuration that is to be used by that vehicle. This potential ADAS alert sensitivity configuration may be achieved, for instance, when the rule conditions are met (as well as any other or alternative rules used by the vehicle) resulting in the vehicle ADAS unit 290 adjusting one or more parameters used in accordance with the vehicle's current ADAS configuration settings.

In other words, in response to receiving an ADAS configuration message from the remote computing system 150, the ADAS unit 290 of each vehicle 302.1-302.N may locally make a determination of whether the alert sensitivity of the ADAS unit 290 should be adjusted. In the present illustrative example, the predetermined rule set 450.1 indicates to the ADAS unit 290 of a respective vehicle to perform this adjustment when the vehicle route intersects with the location of the ADAS alert event and the speed limit at that location is greater than or equal to 110 kph. If the vehicle ADAS unit 290 determines that these conditions are met, then the vehicle ADAS unit 290 adjusts the current ADAS configuration settings to increase the ADAS alert sensitivity for that particular ADAS alert event, when and if the event is encountered. Thus, in the present example, a pedestrian warning may be issued when a more dangerous condition is detected (i.e. the higher speed limit), whereas such an alert may otherwise be suppressed.

Additionally or alternatively, when the vehicle encounters the ADAS alert event, the increased ADAS alert sensitivity may cause a pedestrian detection warning to be issued sooner than would be the default ADAS configuration settings would provide, i.e. when the road speed is not considered. For example, upon detecting the pedestrian, an initial (i.e. default) ADAS parameter may define an alert-based condition, e.g. a threshold time or distance as noted above, which should be met to trigger the issuance of a pedestrian collision warning. The threshold time or distance may thus represent an example of the ADAS parameter used in accordance with the vehicle's current ADAS configuration settings. This parameter may be adjusted (e.g. by being increased) in accordance with the adjusted alert sensitivity of the ADAS, thereby causing the ADAS alert to be issued earlier when the ADAS alert sensitivity is increased.

Another example of a predetermined set of rules 450.2 is shown in FIG. 4A. In this case, the aggregated data set 402 is used in accordance with the rule set 450.2, which defines rule parameters considering the location of a target vehicle within a threshold distance or geographic region of an alert event location, as noted above for the rule set 450.1. However, it is noted that in this example the rule set 450.2 also defines parameters that consider the weather at the vehicle's present location. Thus, the remote computing system 150 may specify, in the transmitted ADAS configuration message, that a recipient vehicle ADAS unit should increase the ADAS sensitivity for any future ADAS alerts to be issued once the vehicle is located in a region experiencing fog or precipitation. The ADAS configuration message may optionally include this weather information for ADAS units that are not capable of detecting the weather at their respective locations, or alternatively provide one or more geofences that encompasses current regions experiencing fog, rain, snow, etc.

The vehicle receiving the ADAS configuration message may then identify whether the rule conditions have been met by either detecting the current weather conditions, comparing its current location with the locations and/or geofences included in the ADAS configuration message, etc. In any event, when the vehicle determines that the rule conditions have been met, the increased ADAS alert sensitivity may cause a forward collision warning (FCW) to be presented earlier to compensate for the additional time required to stop the vehicle during precipitous conditions.

Continuing this example, the FCW may be issued when the ADAS unit 290 determines that a computed TTC value is less than a predetermined threshold time value. Thus, in this example, the ADAS parameter used in accordance with the vehicle's current ADAS configuration settings comprises the predetermined threshold time value, and when the TTC value is less than this predetermined threshold time value, the alert-based condition is met. To provide an illustrative example, the ADAS unit 290 may operate using three different levels of TTC sensitivity, each defining a different predetermined threshold time value. These may include a "near" level of 0.8 seconds before collision with the vehicle ahead, a "mid" level of 1.5 seconds, and a "far" level of 2.5 seconds. The ADAS unit 290 may operate by default using the mid level of 1.5 seconds as the predetermined threshold time value. Then, upon receiving the ADAS configuration message and determining that the rule conditions have been met, the ADAS unit 290 may change the ADAS alert sensitivity level by increasing the ADAS parameter (i.e. the predetermined threshold time value) to the far level of 2.5 seconds, allowing the FCW alert to be issued earlier.

Another example of a predetermined set of rules 450.3 is shown in FIG. 4B. In this case, the aggregated data set 402 is used in accordance with rule parameters that consider the location of a target vehicle within a threshold distance or geographic region of an alert event location 3, as noted above for the rule set 450.1 for the ADAS alert event location 1. In this example, the ADAS alert event location is identified with harsh braking reported at a specific geographic location. However, it is noted that in this example the rule parameters also consider the vehicle route, road speed limit data, and the weather at the ADAS alert event location.

Thus, the remote computing device 150 may specify in the transmitted ADAS configuration message that a recipient vehicle ADAS unit should increase the ADAS sensitivity for any FCW alerts that are issued at the location of the ADAS event location 3, assuming that the rule conditions are met. The ADAS alert sensitivity settings may thus be adjusted as noted above so that the FCW is issued earlier when the vehicle determines that these conditions have been met. Thus, this set of predetermined rules 450.3 enhances safety by anticipating the likelihood of potential FCW alerts being generated at the same location in which harsh braking was previously reported.

A further example of a predetermined set of rules 450.4 is also shown in FIG. 4B. In this case, the aggregated data set 402 is used in accordance with rule parameters that consider the location of a target vehicle within a threshold distance or geographic region of an alert event location 4, as noted above for the rule set 450.1 for the ADAS alert event location 1. In this example the rule parameters also consider the vehicle route and the weather at the ADAS alert event location. In this example, the ADAS alert event is identified with wheel slippage reported at a specific geographic location.

In the illustrative example as shown in FIG. 4B, the rule conditions stipulate that a recipient vehicle of the transmitted ADAS configuration message should, upon determining that the rule conditions have been met, generate a slippery conditions warning. Additionally or alternatively, the recipient vehicle should increase the ADAS alert sensitivity configuration to perform stricter driver monitoring. The predetermined rule 450.4 may thus indicate, for each ADAS alert corresponding to wheel slippage detection in the aggregated data set, that either or both of these ADAS configuration settings be updated, in various embodiments.

Again, the remote computing device 150 may transmit respective ADAS configuration messages to each vehicle 302.1-302.N within a threshold distance of the ADAS alert event 4, within a predetermined geographic area of the ADAS alert event 4, etc. Each ADAS configuration message indicates, for each vehicle receiving the message, a potential ADAS alert sensitivity configuration that is to be used by that vehicle. The ADAS configuration settings may thus be adjusted when the rule conditions are met (as well as any other or alternative rules used by the vehicle).

In the present illustrative example, the predetermined rule set 450.4 informs the respective vehicle ADAS unit to perform this adjustment when the vehicle route intersects with the location of the ADAS alert event and snow is present. Again, if the vehicle ADAS unit determines that these conditions are met, then the vehicle ADAS unit adjusts the current ADAS configuration settings to increase the ADAS alert sensitivity for that particular ADAS alert event, when and if the event is encountered. Thus, in the present example a slippery conditions warning may be issued when it is anticipated that this condition is in fact present at a particular location based upon previous ADAS alerts generated at the same location. Thus, the ADAS parameter that may be adjusted to increase the ADAS alert sensitivity may comprise the decision to issue the slippery conditions warning prior to detecting wheel slippage. As another illustrative example, the stricter driver monitoring may be implemented by increasing the sensitivity of a driver monitoring system (DMS), e.g. by increasing the frequency of the driver monitoring, increasing time-based thresholds identified with a diverted driver gaze, etc.

Figure 5:
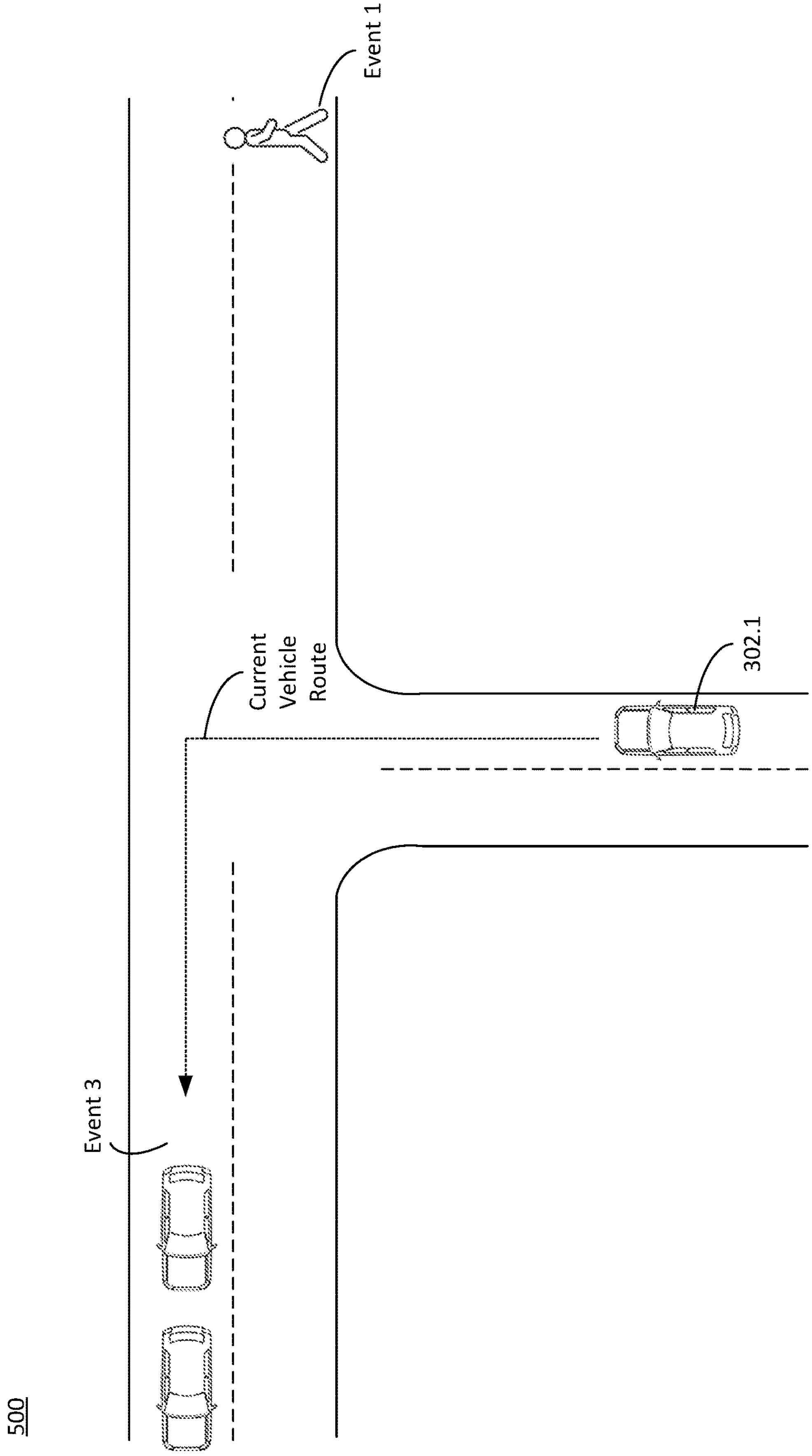
FIG. 5 illustrates an example road scenario for selectively adjusting ADAS alert sensitivity settings, in accordance with one or more aspects of the present disclosure.

FIG. 5 illustrates an example road scenario for adjusting ADAS alert sensitivity settings, in accordance with one or more aspects of the present disclosure. FIG. 5 shows an example scenario 500 to demonstrate the manner in which the ADAS alert sensitivity may be adjusted. The example scenario 500 includes a road with a T-intersection, with the vehicle 302.1 driving in a direction approaching the intersection. The location of two of the ADAS alert events as shown in FIG. 4A and discussed above are indicated on the road at their respective locations. Thus, the vehicle 302.1 may receive an ADAS configuration message as discussed herein, which may indicate the specific rule conditions that are to be met to cause the ADAS unit 290 of the vehicle 302.1 to adjust its ADAS alert sensitivity settings for each one of these detected ADAS alert events.

However, and as noted above, the vehicle 302.1 need not adjust the ADAS alert sensitivity settings immediately upon receiving the ADAS configuration message, but instead may do so upon other conditions being met that ensure that a detected ADAS alert event will be relevant (e.g. experienced by) the vehicle 302.1. In an embodiment, the ADAS unit 290 of the vehicle 302.1 may adjust the ADAS alert sensitivity settings as noted herein when a current route of the vehicle 302.1 intersects with the location of the detected ADAS alert event. This decision may be made, for instance, based upon current routing data if the vehicle 302.1 is following a planned route. Additionally or alternatively, the decision regarding whether to adjust the ADAS alert sensitivity settings as noted herein may be made by the ADAS unit 290 of the vehicle 302.1 upon the vehicle 302.1 completing the turn.

For example, if turning left as shown in FIG. 5, the ADAS unit 290 of the vehicle 302.1 need not adjust the ADAS alert sensitivity settings for the ADAS alert event 1, but may adjust the ADAS alert sensitivity settings for the ADAS alert event 3. In this way, the ADAS unit 290 is able to display the relevant alert and change the sensitivity according to a configuration and a predefined alert priority, which may indicate an adjustment only for those ADAS alert events that the vehicle 302.1 is capable of experiencing based upon its route, the layout of the lanes and/or road, the location of the ADAS alert event with respect to the vehicle 302.1, etc. Thus, the ADAS configuration message transmitted to the vehicle 302.1 may indicate the location and predefined rules with respect to each of the ADAS alert events 1 and 3. However, the "final" decision to actually adjust the ADAS alert sensitivity settings is calculated by the ADAS unit 290 of the vehicle 302.1 according to the direction of the drive and/or other relevant conditions, in various embodiments.

Again, it is noted that the decision regarding which ADAS alert events may be relevant for a particular vehicle is also determined via the remote computing device, although the ADAS unit 290 of the vehicle may perform the final determination in this regard. In other words, the remote computing system 150 may transmit the ADAS configuration messages to specific vehicles that indicate, for each vehicle, a set of "candidate" ADAS alert events, which may be based upon the location and/or direction of the vehicle, the road type, the speed limit, etc. The ADAS unit 290 of each vehicle may then identify which of these candidate ADAS alert events subsequently qualifies for an adjustment to the ADAS sensitivity settings when the ADAS alert event is going to be encountered by the vehicle. Thus, the remote computing system 150 may calculate a large number of ADAS alert events over a larger radius of calculation, which may potentially apply to one or more vehicles travelling through that region. A subset of these ADAS alert events may subsequently be identified in the ADAS configuration messages that are transmitted to each respective vehicle upon each vehicle meeting an initial set of predefined conditions, such as a proximity (e.g. within a threshold distance, approaching the ADAS alert event within a threshold time period, etc.) to the subset of ADAS alert events, for example.

Thus, the ADAS configuration messages enable each ADAS unit 290 to adjust its ADAS alert sensitivity settings by adjusting a respective parameter of the ADAS corresponding to each different detected ADAS alert event. Thus, upon the ADAS unit 290 determining that an ADAS alert event is relevant to that particular vehicle, any one of the different parameters of the ADAS unit 290 may thereby be modified to adjust the alert sensitivity of the ADAS for each one of the detected ADAS alert events. Moreover, it is noted that the embodiments are primarily described herein in terms of the ADAS sensitivity settings being adjusted via a single parameter per ADAS alert event, although this is for ease of explanation and not intended as a limitation of the functionality of the embodiments as described herein.

Instead, the embodiments as described herein may enable the ADAS unit 290 to adjust the ADAS sensitivity settings by modifying any suitable number of parameters on a per ADAS alert event basis. To provide an illustrative example, upon detecting that the conditions are met as defined by the predetermined rule set 450.2 (a weather alert, e.g. weather conditions such as fog or precipitation at the vehicle's location), the ADAS unit 290 of the vehicle may adjust the defined threshold time periods for triggering the FCW as noted above, and additionally may adjust other ADAS parameters such as increasing the threshold distance for triggering a Headway Monitoring and Warning (HMW) ADAS alert, reducing the threshold deviation distances for triggering a lane departure warning (LDW) ADAS alert, etc.

Again, the remote computing system 150 may utilize an aggregated data set together with predefined rules to generate and transmit ADAS configuration messages to various vehicles, which may use these ADAS configuration messages to display notifications and/or adjust ADAS alert sensitivity settings. These predefined rule sets may utilize any suitable number and/or type of parameters in addition to or instead of the examples as shown in FIGS. 4A-4B. In this way, the predefined rule sets may provide flexibility with respect to how ADAS alerts are presented in various scenarios, which may consider dynamically changing environmental and/or traffic conditions.

To provide another illustrative example, the predefined rule set 450.3 is identified with the occurrence of a harsh braking ADAS alert event. The rules may specify further conditions not shown in FIG. 4B that enables an intelligent determination to be made regarding whether this ADAS alert event is particularly dangerous, which would lead to the adjustment by the vehicle ADAS unit of the ADAS alert sensitivity settings. For instance, if the location of the ADAS alert event 3 is also identified with a high traffic density, then this may be considered as part of the rule parameters such that the ADAS alert sensitivity settings are not adjusted, as it is understood that traffic in general is braking in response to this particular event. In contrast, if the location of the ADAS alert event 3 is identified with a low traffic density (and optionally the road speed limit being relatively high, e.g. 100 kph or above), then this may be considered as part of the rule parameters such that the ADAS alert sensitivity settings are adjusted. In this case, it is understood that the sudden braking may be in response to a recent or unanticipated event, which other vehicles may also potentially experience, and thus represent a higher safety risk compared with the previous scenario.

As a further illustrative example, the predefined rule sets may be based upon predefined profiles that are established by a fleet manager using personal data collected within the context of a specific vehicle/driver. Thus, when used as part of a fleet management system, the vehicles serviced by the remote computing system 150 (i.e. the vehicles from which the vehicle ADAS messages are received from and the ADAS configuration messages are transmitted to) may be part of a fleet of vehicles that are managed by a fleet operator. The predetermined rule sets may include personalized parameters that are targeted to the profiles of a specific driver, who may be correlated with an assigned vehicle. For instance, by using a correlation of driver profile data with assigned vehicles, a fleet manager may design predefined rule sets to be driver specific by leveraging the available driver data for that particular vehicle. As one illustrative example, a predefined rule set, among two different drivers, different ADAS alert sensitivity settings to be adjusted in response to the same type of ADAS alert event. In this way, an older driver may be provided with an ADAS alert earlier than a younger driver, anticipating differences in these driver's reaction times.

In this way, the aspects as discussed herein enable a "smart" vehicle ADAS, which may also function as an infrastructure component by providing data in the way of the transmitted vehicle ADAS messages. In doing so, the aspects described herein function to expand the safety features that may already be present in conventional ADAS units, such as Headway Monitoring and Warning (HMW), Forward Collision Warning (FCW), lane departure warning (LDW), etc. Examples of smart ADAS icons and their corresponding meanings, which may be presented as part of the smart ADAS embodiments as discussed herein, are provided in FIG. 6 by way of example and not limitation.

Figure 7:
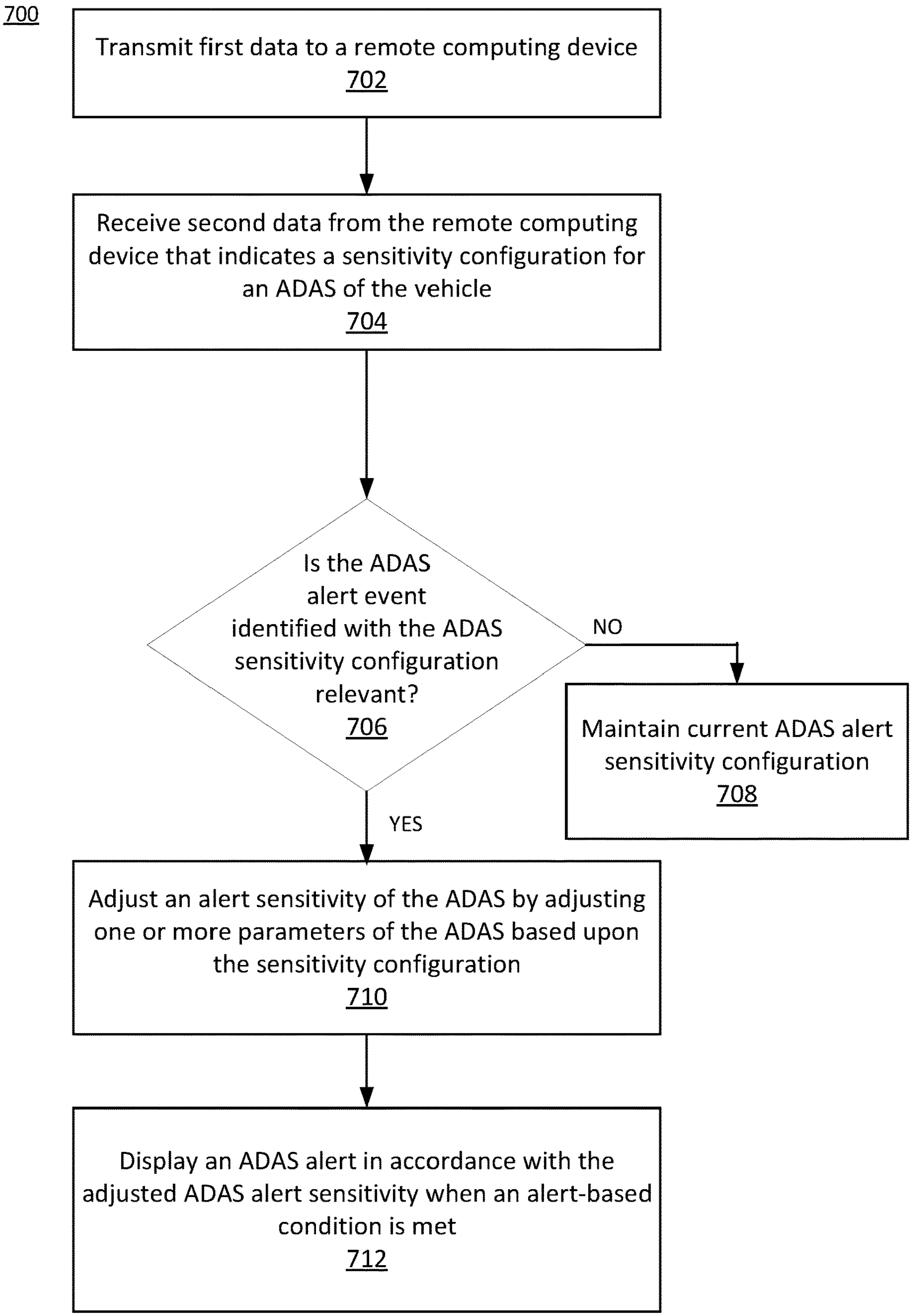
FIG. 7 illustrates an example process flow, in accordance with one or more aspects of the disclosure.

FIG. 7 illustrates an example of a process flow, in accordance with one or more aspects of the disclosure. The process flow 700 may include alternate or additional steps that are not shown in FIG. 7 for purposes of brevity, and may be performed in a different order than the steps shown in FIG. 7.

With reference to FIG. 7, the process flow 700 may be a computer-implemented method executed by and/or otherwise associated with one or more processors (processing circuitry) and/or storage devices. The functionality associated with the process flow 700 as discussed herein may be executed, for instance, via a suitable computing device and/or processing circuitry identified with the vehicle 100 and/or the safety system 200, which may comprise part of or the entirety of the ADAS unit 290 as discussed herein. This may include, for example, the one or more processors 102, one or more of the processors 214A, 214B, 216, 218, etc., executing instructions stored in a suitable memory (e.g. the one or more memories 202). In other aspects, the functionality associated with the process flow 700 as discussed herein may be executed, for instance, via processing circuitry identified with any suitable type of computing device that may be identified with the vehicle 100 (e.g. a chip, an aftermarket product, etc.) or otherwise communicates with one or more components of the vehicle 100. The functionally as discussed with respect to the process flow 700 may additionally or alternatively be via one or more remote computing devices, such as the remote computing system 150 as discussed herein.

The process flow 700 may begin with the transmission (block 702) of first data to a remote computing device. The first data may, for example, identify the location of a vehicle, as noted herein. Additionally or alternatively, the first data may include any other suitable information that may be used by the remote computing system 150 as discussed above to generate and transmit the second data to one or more vehicles within a service range. For instance, the first data may include a location of a detected event, which may include ADAS alert events or other detected events and/or objects recognized by the ADAS unit 290, as well as a classification, description, type, etc. of the detected event. As an illustrative example, the first data may include the detection of a pedestrian on a high speed road, as well as the location of the pedestrian when detected. The first data may be included, for example, as part of the periodically transmitted vehicle ADAS messages as noted herein. The location of the vehicle may be identified, for example, via an onboard vehicle GPS system, via features identified in the AV map data, etc. The remote computing device may be identified, for instance, with the remote computing system 150 as discussed herein.

The process flow 700 may include receiving (block 704) second data from the remote computing device. The second data may, for example indicate an ADAS alert sensitivity configuration, as noted herein. The second data may include, for example, data that is part of an ADAS configuration message that is transmitted to each vehicle 302.1-302.N and processed via each vehicle's ADAS unit 290, as noted herein. Thus, the second data may comprise the predetermined rules and conditions to be met for each identified ADAS alert event, which the ADAS unit 290 may utilize to determine whether that ADAS alert event is relevant to the vehicle. Additionally or alternatively, the second data may include any other suitable information that may be used by each vehicle's ADAS unit 290, as noted herein, to determine whether an ADAS alert event identified with the ADAS alert sensitivity configuration is relevant. For instance, the second data may include data obtained via the supplemental data sources 320, which may comprise third party data such as weather data, traffic data, etc.

The process flow 700 may include determining (block 706) whether an ADAS alert event, which is identified with the ADAS sensitivity configuration from received in the second data, is relevant to the vehicle. Again, this determination maybe made, for instance, via the ADAS unit 290 of the vehicle, and may include the determination of whether any suitable number of conditions are met such as the ADAS alert event location intersecting with the route of the vehicle, the vehicle approaching the ADAS alert event location within a threshold time period, weather conditions at the alert event location, etc.

If it is determined that the ADAS alert event is not relevant to the vehicle, then the process flow 700 comprises maintaining (block 708) the current ADAS alert sensitivity settings. Otherwise, the process flow 700 comprises adjusting (block 710) the ADAS alert sensitivity settings by adjusting on or more parameters of the ADAS unit based upon the ADAS configuration settings received in the second data. Again, these parameters may include, for instance, various time and/or distance-based alert-based conditions (e.g. thresholds) that, when met, result in the issuance of a specific type of ADAS alert for the ADAS alert event that is identified in the received second data.

The process flow 700 may comprise displaying (block 712) an ADAS alert in accordance with the adjusted ADAS alert sensitivity configuration. The ADAS alert may be displayed, for example, when the alert-based condition is met, which again has been adjusted (block 710) in accordance with the received ADAS configuration settings. Again, the ADAS alerts may include various types of alerts that are issued based upon the type of ADAS alert event that was detected, which may include those as shown and discussed herein and in FIG. 6 for example.

EXAMPLES

The following examples pertain to further aspects.

An example (e.g. example 1) relates to a method. The method comprises transmitting, via processing circuitry of a vehicle, first data to a remote computing device that identifies a location of the vehicle; receiving, via the processing circuitry, second data from the remote computing device that indicates a sensitivity configuration to be used for an advanced driver assistance system (ADAS) of the vehicle based upon the location of the vehicle; adjusting, via the processing circuitry, a parameter of the ADAS based upon the received sensitivity configuration to thereby adjust an alert sensitivity of the ADAS; and when an alert-based condition is met in accordance with the adjusted ADAS alert sensitivity of the ADAS, causing, via the processing circuitry, an ADAS alert to be displayed.

Another example (e.g. example 2) relates to a previously-described example (e.g. example 1), wherein the first data further identifies ADAS alert events detected by the vehicle, a location of the ADAS alert events, and a current vehicle configuration.

Another example (e.g. example 3) relates to a previously-described example (e.g. one or more of examples 1-2), wherein the second data transmitted to the vehicle is generated by the remote computing device by: aggregating first data received from a plurality of vehicles to generate an aggregated data set that comprises (i) ADAS alert events detected by the plurality of vehicles, and (ii) a respective location of each one of the detected ADAS alert events; and using the aggregated data set in accordance with a set of predetermined rules to define corresponding sensitivity configurations for each one of the detected ADAS alert events.

Another example (e.g. example 4) relates to a previously-described example (e.g. one or more of examples 1-3), wherein the second data further comprises a portion of the aggregated data set corresponding to ADAS alert events having location that is within a threshold distance from the vehicle.

Another example (e.g. example 5) relates to a previously-described example (e.g. one or more of examples 1-4), wherein adjusting the parameter of the ADAS comprises: adjusting the sensitivity configuration of the ADAS of the vehicle for one of the detected ADAS alert events when a current route of the vehicle intersects with a location of the one of the detected ADAS alert events.

Another example (e.g. example 6) relates to a previously-described example (e.g. one or more of examples 1-5), wherein adjusting the parameter of the ADAS comprises: adjusting the sensitivity configuration of the ADAS of the vehicle for one of the detected ADAS alert events when the vehicle will reach a location of the one of the detected ADAS alert events within a contact threshold time period.

Another example (e.g. example 7) relates to a previously-described example (e.g. one or more of examples 1-6), wherein the parameter of the ADAS that is adjusted comprises an alert threshold time period, and wherein the alert-based condition is met when a time required for the vehicle to reach a detected ADAS alert event is less than or equal to the alert threshold time period.

Another example (e.g. example 8) relates to a previously-described example (e.g. one or more of examples 1-7), wherein the set of predetermined rules define corresponding sensitivity configurations for each one of the detected ADAS alert events are further based upon weather data and road data associated with each one of detected ADAS alert events.

Another example (e.g. example 9) relates to a previously-described example (e.g. one or more of examples 1-8), wherein: the second data indicates a sensitivity configuration to be used for the ADAS of the vehicle with respect to detected ADAS alert events that are included as part of the received second data.

Another example (e.g. example 10) relates to a previously-described example (e.g. one or more of examples 1-9), wherein the parameter of the ADAS is from among a plurality of parameters, each one of the plurality of the parameters being identified with a different respective one of the detected ADAS alert events, and wherein adjusting the parameter of the ADAS comprises: adjusting each one of the plurality of parameters of the ADAS to adjust the alert sensitivity of the ADAS for each one of the detected ADAS alert events.

An example (e.g. example 11) relates to a vehicle. The vehicle comprises: a memory configured to store instructions; and processing circuitry that is part of an advanced driver assistance system (ADAS) of the vehicle, the processing circuitry being configured to execute the instructions stored in the memory to cause the vehicle to: transmit first data to a remote computing device that identifies a location of the vehicle; receive second data from the remote computing device that indicates a sensitivity configuration to be used for the ADAS of the vehicle based upon the location of the vehicle; adjust a parameter of the ADAS based upon the received sensitivity configuration to thereby adjust an alert sensitivity of the ADAS; and when an alert-based condition is met in accordance with the adjusted alert sensitivity of the ADAS, cause an ADAS alert to be displayed.

Another example (e.g. example 12) relates to a previously-described example (e.g. example 11), wherein the first data further identifies ADAS alert events detected by the vehicle, a location of the ADAS alert events, and a current vehicle configuration.

Another example (e.g. example 13) relates to a previously-described example (e.g. one or more of examples 11-12), wherein the second data transmitted to the vehicle is generated by the remote computing device by: aggregating first data received from a plurality of vehicles to generate an aggregated data set that comprises (i) ADAS alert events detected by the plurality of vehicles, and (ii) a respective location of each one of the detected ADAS alert events; and using the aggregated data set in accordance with a set of predetermined rules to define corresponding sensitivity configurations for each one of the detected ADAS alert events.

Another example (e.g. example 14) relates to a previously-described example (e.g. one or more of examples 11-13), wherein the second data further comprises a portion of the aggregated data set corresponding to ADAS alert events having location that is within a threshold distance from the vehicle.

Another example (e.g. example 15) relates to a previously-described example (e.g. one or more of examples 11-14), wherein the processing circuitry is configured to adjust the parameter of the ADAS by adjusting the sensitivity configuration of the ADAS of the vehicle for one of the detected ADAS alert events when a current route of the vehicle intersects with a location of the one of the detected ADAS alert events.

Another example (e.g. example 16) relates to a previously-described example (e.g. one or more of examples 11-15), wherein the processing circuitry is configured to adjust the parameter of the ADAS by adjusting the sensitivity configuration of the ADAS of the vehicle for one of the detected ADAS alert events when the vehicle will reach a location of the one of the detected ADAS alert events within a contact threshold time period.

Another example (e.g. example 17) relates to a previously-described example (e.g. one or more of examples 11-16), wherein the parameter of the ADAS that is adjusted comprises an alert threshold time period, and wherein the alert-based condition is met when a time required for the vehicle to reach a detected ADAS alert event is less than or equal to the alert threshold time period.

Another example (e.g. example 18) relates to a previously-described example (e.g. one or more of examples 11-17), wherein the set of predetermined rules define corresponding sensitivity configurations for each one of the detected ADAS alert events are further based upon weather data and road data associated with each one of detected ADAS alert events.

Another example (e.g. example 19) relates to a previously-described example (e.g. one or more of examples 11-18), wherein: the second data indicates a sensitivity configuration to be used for the ADAS of the vehicle with respect to detected ADAS alert events that are included as part of the received second data.

Another example (e.g. example 20) relates to a previously-described example (e.g. one or more of examples 11-19), wherein the parameter of the ADAS is from among a plurality of parameters, each one of the plurality of the parameters being identified with a different respective one of the detected ADAS alert events, and wherein the processing circuitry is configured to adjust the parameter of the ADAS by adjusting each one of the plurality of parameters of the ADAS to adjust the alert sensitivity of the ADAS for each one of the detected ADAS alert events.

An example (e.g. example 21) relates to a non-transitory computer-readable medium having instructions stored thereon that, when executed by processing circuitry associated with a vehicle, cause the vehicle to: transmit first data to a remote computing device that identifies a location of the vehicle; receive second data from the remote computing device that indicates a sensitivity configuration to be used for an advanced driver assistance system (ADAS) of the vehicle based upon the location of the vehicle; adjust a parameter of the ADAS based upon the received sensitivity configuration to thereby adjust an alert sensitivity of the ADAS; and when an alert-based condition is met in accordance with the adjusted alert sensitivity of the ADAS, cause an ADAS alert to be displayed.

Another example (e.g. example 22) relates to a previously-described example (e.g. example 21), wherein the first data further identifies ADAS alert events detected by the vehicle, a location of the ADAS alert events, and a current vehicle configuration.

Another example (e.g. example 23) relates to a previously-described example (e.g. one or more of examples 21-22), wherein the second data transmitted to the vehicle is generated by the remote computing device by: aggregating first data received from a plurality of vehicles to generate an aggregated data set that comprises (i) ADAS alert events detected by the plurality of vehicles, and (ii) a respective location of each one of the detected ADAS alert events; and using the aggregated data set in accordance with a set of predetermined rules to define corresponding sensitivity configurations for each one of the detected ADAS alert events.

Another example (e.g. example 24) relates to a previously-described example (e.g. one or more of examples 21-23), wherein the second data further comprises a portion of the aggregated data set corresponding to ADAS alert events having location that is within a threshold distance from the vehicle.

Another example (e.g. example 25) relates to a previously-described example (e.g. one or more of examples 21-24), wherein the instructions further cause the vehicle to adjust the parameter of the ADAS by adjusting the sensitivity configuration of the ADAS of the vehicle for one of the detected ADAS alert events when a current route of the vehicle intersects with a location of the one of the detected ADAS alert events.

Another example (e.g. example 26) relates to a previously-described example (e.g. one or more of examples 21-25), wherein the instructions further cause the vehicle to adjust the parameter of the ADAS by adjusting the sensitivity configuration of the ADAS of the vehicle for one of the detected ADAS alert events when the vehicle will reach a location of the one of the detected ADAS alert events within a contact threshold time period.

Another example (e.g. example 27) relates to a previously-described example (e.g. one or more of examples 21-26), wherein the parameter of the ADAS that is adjusted comprises an alert threshold time period, and wherein the alert-based condition is met when a time required for the vehicle to reach a detected ADAS alert event is less than or equal to the alert threshold time period.

Another example (e.g. example 28) relates to a previously-described example (e.g. one or more of examples 21-27), wherein the set of predetermined rules define corresponding sensitivity configurations for each one of the detected ADAS alert events are further based upon weather data and road data associated with each one of detected ADAS alert events.

Another example (e.g. example 29) relates to a previously-described example (e.g. one or more of examples 21-28), wherein: the second data indicates a sensitivity configuration to be used for the ADAS of the vehicle with respect to detected ADAS alert events that are included as part of the received second data.

Another example (e.g. example 30) relates to a previously-described example (e.g. one or more of examples 21-29), wherein the parameter of the ADAS is from among a plurality of parameters, each one of the plurality of the parameters being identified with a different respective one of the detected ADAS alert events, and wherein the instructions further cause the vehicle to adjust the parameter of the ADAS by adjusting each one of the plurality of parameters of the ADAS to adjust the alert sensitivity of the ADAS for each one of the detected ADAS alert events.

A method as shown and described.

An apparatus as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A method, comprising:

transmitting, via one or more wireless transceivers of a vehicle, first data to a remote computing device that identifies a location of the vehicle;

receiving, via the one or more wireless transceivers, second data from the remote computing device that indicates a sensitivity configuration indicative of one or more advanced driver assistance system (ADAS) alert parameters to be used for triggering an ADAS alert of the vehicle based upon the location of the vehicle;

adjusting, via processing circuitry, an ADAS alert parameter of the ADAS alert parameters based upon the received second data to thereby adjust an alert sensitivity of the ADAS; and when an alert-based condition is met in accordance with the adjusted ADAS alert sensitivity of the ADAS, causing, via the processing circuitry, an ADAS alert to be displayed, wherein the ADAS alert parameter that is adjusted comprises an alert threshold time period.

2. The method of claim 1, wherein the first data further identifies ADAS alert events detected by the vehicle, a location of the ADAS alert events, and a current vehicle configuration.

3. The method of claim 1, wherein the second data transmitted to the vehicle is generated by the remote computing device by:

aggregating first data received from a plurality of vehicles to generate an aggregated data set that comprises (i) ADAS alert events detected by the plurality of vehicles, and (ii) a respective location of each one of the detected ADAS alert events; and using the aggregated data set in accordance with a set of predetermined rules to define corresponding sensitivity configurations for each one of the detected ADAS alert events.

4. The method of claim 3, wherein the second data further comprises a portion of the aggregated data set corresponding to ADAS alert events having a location that is within a threshold distance from the vehicle.

5. The method of claim 4, wherein adjusting the ADAS alert parameter comprises:

adjusting the sensitivity configuration of the ADAS of the vehicle for one of the detected ADAS alert events when a current route of the vehicle intersects with a location of the one of the detected ADAS alert events.

6. The method of claim 4, wherein adjusting the ADAS alert parameter comprises:

adjusting the sensitivity configuration of the ADAS of the vehicle for one of the detected ADAS alert events when the vehicle will reach a location of the one of the detected ADAS alert events within a contact threshold time period.

7. The method of claim 1, wherein the alert-based condition is met when a time required for the vehicle to reach a detected ADAS alert event is less than or equal to the alert threshold time period.

8. The method of claim 3, wherein the set of predetermined rules that define corresponding sensitivity configurations for each one of the detected ADAS alert events are further based upon weather data and road data associated with each one of the detected ADAS alert events.

9. The method of claim 1, wherein:

the second data indicates a sensitivity configuration to be used for the ADAS of the vehicle with respect to detected ADAS alert events that are included as part of the received second data.

10. The method of claim 9, wherein the one or more ADAS alert parameters comprise a plurality of ADAS alert parameters, each one of the plurality of the ADAS alert parameters being identified with a different respective one of the detected ADAS alert events, and wherein adjusting the ADAS alert parameter comprises:

adjusting each one of the plurality of ADAS alert parameters to adjust the alert sensitivity of the ADAS for each one of the detected ADAS alert events.

11. A vehicle, comprising:

a memory configured to store instructions; and processing circuitry that is part of an advanced driver assistance system (ADAS) of the vehicle, the processing circuitry being configured to execute the instructions stored in the memory to cause the vehicle to:

transmit, via one or more wireless transceivers, first data to a remote computing device that identifies a location of the vehicle;

receive, via the one or more wireless transceivers, second data from the remote computing device that indicates a sensitivity configuration indicative of one or more ADAS alert parameters to be used for triggering an ADAS alert of the vehicle based upon the location of the vehicle;

adjust an ADAS alert parameter of the ADAS alert parameters based upon the received second data to thereby adjust an alert sensitivity of the ADAS; and when an alert-based condition is met in accordance with the adjusted alert sensitivity of the ADAS, cause an ADAS alert to be displayed, wherein the ADAS alert parameter that is adjusted comprises an alert threshold time period.

12. The vehicle of claim 11, wherein the first data further identifies ADAS alert events detected by the vehicle, a location of the ADAS alert events, and a current vehicle configuration.

13. The vehicle of claim 11, wherein the second data transmitted to the vehicle is generated by the remote computing device by:

aggregating first data received from a plurality of vehicles to generate an aggregated data set that comprises (i) ADAS alert events detected by the plurality of vehicles, and (ii) a respective location of each one of the detected ADAS alert events; and using the aggregated data set in accordance with a set of predetermined rules to define corresponding sensitivity configurations for each one of the detected ADAS alert events.

14. The vehicle of claim 13, wherein the second data further comprises a portion of the aggregated data set corresponding to ADAS alert events having a location that is within a threshold distance from the vehicle.

15. The vehicle of claim 14, wherein the processing circuitry is configured to adjust the ADAS alert parameter by adjusting the sensitivity configuration of the ADAS of the vehicle for one of the detected ADAS alert events when a current route of the vehicle intersects with a location of the one of the detected ADAS alert events.

16. The vehicle of claim 14, wherein the processing circuitry is configured to adjust the ADAS alert parameter by adjusting the sensitivity configuration of the ADAS of the vehicle for one of the detected ADAS alert events when the vehicle will reach a location of the one of the detected ADAS alert events within a contact threshold time period.

17. The vehicle of claim 11, wherein the alert-based condition is met when a time required for the vehicle to reach a detected ADAS alert event is less than or equal to the alert threshold time period.

18. The vehicle of claim 13, wherein the set of predetermined rules that define corresponding sensitivity configurations for each one of the detected ADAS alert events are further based upon weather data and road data associated with each one of the detected ADAS alert events.

19. The vehicle of claim 11, wherein:

the second data indicates a sensitivity configuration to be used for the ADAS of the vehicle with respect to detected ADAS alert events that are included as part of the received second data.

20. The vehicle of claim 19, wherein the one or more ADAS alert parameters comprise a plurality of ADAS alert parameters, each one of the plurality of ADAS alert parameters being identified with a different respective one of the detected ADAS alert events, and wherein the processing circuitry is configured to adjust the ADAS alert parameter by adjusting each one of the plurality of ADAS alert parameters to adjust the alert sensitivity of the ADAS for each one of the detected ADAS alert events.

21. A non-transitory computer-readable medium having instructions stored thereon that, when executed by processing circuitry associated with a vehicle, cause the vehicle to:

transmit, via one or more wireless transceivers, first data to a remote computing device that identifies a location of the vehicle;

receive, via the one or more wireless transceivers, second data from the remote computing device that indicates a sensitivity configuration indicative of one or more advanced driver assistance system (ADAS) alert parameters to be used for triggering an ADAS alert of the vehicle based upon the location of the vehicle;

adjust an ADAS alert parameter of the ADAS alert parameters based upon the received second data to thereby adjust an alert sensitivity of the ADAS; and when an alert-based condition is met in accordance with the adjusted alert sensitivity of the ADAS, cause an ADAS alert to be displayed, wherein the ADAS alert parameter that is adjusted comprises an alert threshold time period.

22. The non-transitory computer-readable medium of claim 21, wherein the first data further identifies ADAS alert events detected by the vehicle, a location of the ADAS alert events, and a current vehicle configuration.

23. The non-transitory computer-readable medium of claim 21, wherein the second data transmitted to the vehicle is generated by the remote computing device by:

aggregating first data received from a plurality of vehicles to generate an aggregated data set that comprises (i) ADAS alert events detected by the plurality of vehicles, and (ii) a respective location of each one of the detected ADAS alert events; and using the aggregated data set in accordance with a set of predetermined rules to define corresponding sensitivity configurations for each one of the detected ADAS alert events.

24. The non-transitory computer-readable medium of claim 23, wherein the second data further comprises a portion of the aggregated data set corresponding to ADAS alert events having a location that is within a threshold distance from the vehicle.

25. The non-transitory computer-readable medium of claim 24, wherein the instructions further cause the vehicle to adjust the ADAS alert parameter by adjusting the sensitivity configuration of the ADAS of the vehicle for one of the detected ADAS alert events when a current route of the vehicle intersects with a location of the one of the detected ADAS alert events.

26. The non-transitory computer-readable medium of claim 24, wherein the instructions further cause the vehicle to adjust the ADAS alert parameter by adjusting the sensitivity configuration of the ADAS of the vehicle for one of the detected ADAS alert events when the vehicle will reach a location of the one of the detected ADAS alert events within a contact threshold time period.

27. The non-transitory computer-readable medium of claim 21, wherein the alert-based condition is met when a time required for the vehicle to reach a detected ADAS alert event is less than or equal to the alert threshold time period.

28. The non-transitory computer-readable medium of claim 23, wherein the set of predetermined rules that define corresponding sensitivity configurations for each one of the detected ADAS alert events are further based upon weather data and road data associated with each one of the detected ADAS alert events.

29. The non-transitory computer-readable medium of claim 21, wherein:

the second data indicates a sensitivity configuration to be used for the ADAS of the vehicle with respect to detected ADAS alert events that are included as part of the received second data.

30. The non-transitory computer-readable medium of claim 29, wherein the one or more ADAS alert parameters comprise a plurality of ADAS alert parameters, each one of the plurality of the ADAS alert parameters being identified with a different respective one of the detected ADAS alert events, and wherein the instructions further cause the vehicle to adjust the ADAS alert parameter by adjusting each one of the plurality of ADAS alert parameters to adjust the alert sensitivity of the ADAS for each one of the detected ADAS alert events.

* * * * *